(12) United States Patent (10) Patent No.: US 12,531,665 B2
Bar-Or Tillinger et al. (45) Date of Patent: Jan. 20, 2026

(54) HARQ PROCEDURES FOR DISTRIBUTED VIDEO CODING

(71) Applicant: QUALCOMM Incorporated, San Diego, CA (US)

(72) Inventors: Amit Bar-Or Tillinger, Tel-Aviv (IL); Gideon Shlomo Kutz, Ramat Hasharon (IL); David Yunusov, Holon (IL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/467,620

(22) Filed: Sep. 14, 2023

(65) Prior Publication Data

US 2025/0096951 A1 Mar. 20, 2025

(51) Int. Cl.
*H04L 1/1829* (2023.01)
*H04L 1/1812* (2023.01)
*H04L 5/00* (2006.01)

(52) U.S. Cl.
CPC .......... *H04L 1/1854* (2013.01); *H04L 1/1812* (2013.01); *H04L 5/0044* (2013.01)

(58) Field of Classification Search
CPC .... H04L 1/1854; H04L 1/1812; H04L 5/0044
See application file for complete search history.

(56) References Cited

U.S. PATENT DOCUMENTS

| | | | | |
|---|---|---|---|---|
| 2009/0269807 | A1* | 10/2009 | Gladyshev | C12P 21/02 435/325 |
| 2012/0050457 | A1* | 3/2012 | Gu | H04N 19/114 348/E7.077 |
| 2015/0009930 | A1* | 1/2015 | Rapaport | H04W 72/542 370/329 |
| 2020/0021775 | A1* | 1/2020 | O'Connell | G08C 15/06 |
| 2024/0364929 | A1 | 10/2024 | Bar-Or Tillinger et al. | |

* cited by examiner

*Primary Examiner* — Thien Nguyen
(74) *Attorney, Agent, or Firm* — QUALCOMM Incorporated

(57) ABSTRACT

Method and apparatus for HARQ procedures for DVC. The apparatus sorts one or more bits of a payload based on a corresponding priority. The apparatus divides the payload into one or more groups based on the corresponding priority, where each of the one or more groups is encoded separately. The apparatus transmits, to a second wireless device, a video frame over a span of one or more slots based at least on a prioritized transmission of the one or more groups.

13 Claims, 24 Drawing Sheets

HARQ PROCEDURES FOR DISTRIBUTED VIDEO CODING

TECHNICAL FIELD

The present disclosure relates generally to communication systems, and more particularly, to a configuration for hybrid automatic repeat request (HARQ) procedures for distributed video coding (DVC).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects. This summary neither identifies key or critical elements of all aspects nor delineates the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus sorts one or more bits of a payload based on a corresponding priority. The apparatus divides the payload into one or more groups based on the corresponding priority, wherein each of the one or more groups is encoded separately. The apparatus transmits, to a second wireless device, a video frame over a span of one or more slots based at least on a prioritized transmission of the one or more groups.

In an aspect of the disclosure, a method, a computer-readable medium, and an apparatus are provided. The apparatus may be a device at a network node. The device may be a processor and/or a modem at a network node or the network node itself. The apparatus receives, from a first wireless device, a video frame over a span of one or more slots based at least on a prioritized transmission of one or more groups of a divided payload. The apparatus transmits, to the second wireless device, an acknowledgement (ACK) or non-acknowledgment (NACK) of reception of the video frame, wherein transmission of the video frame is based on the prioritized transmission or a prioritized retransmission of the one or more groups having a higher priority over the one or more groups having a lower priority.

In an aspect of the disclosure, a method, a computer-readable medium, and an apparatus are provided. The apparatus performs a prediction enhancement of a video compression output, wherein the prediction enhancement is based at least on an interleave operation or a code block order operation. The apparatus transmits, to a second wireless device, encoded systematic bits of a video frame comprising an imbalance enhancement of a prediction quality based on the prediction enhancement.

In an aspect of the disclosure, a method, a computer-readable medium, and an apparatus are provided. The apparatus may be a device at a network node. The device may be a processor and/or a modem at a network node or the network node itself. The apparatus receives, from a first wireless device, encoded systematic bits of a video frame comprising an imbalance enhancement of a prediction quality based on a prediction enhancement, wherein the prediction enhancement is based at least on an interleave operation or a code block order operation. The apparatus performs a complementary prediction enhancement procedure comprising at least one of a de-interleave operation or a code block de-order operation on decoded systematic bits of the video frame to predict content of one or more subsequent video frames based on a previously received video frame.

To the accomplishment of the foregoing and related ends, the one or more aspects may include the features hereinafter fully described and particularly pointed out in the claims. The following description and the drawings set forth in detail certain illustrative features of the one or more aspects. These features are indicative, however, of but a few of the various ways in which the principles of various aspects may be employed.

DETAILED DESCRIPTION

Figure 1:
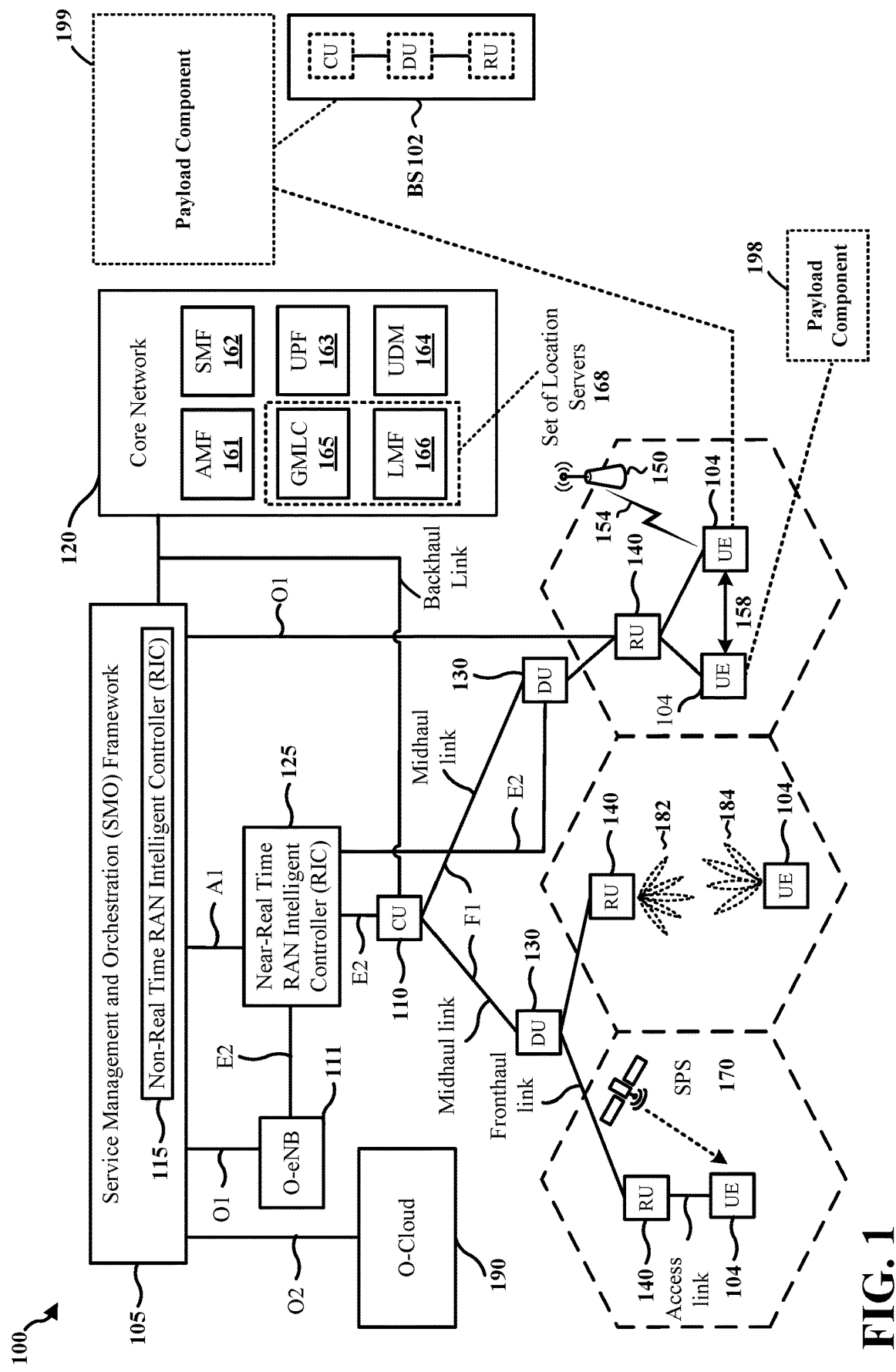
FIG. 1 is a diagram illustrating an example of a wireless communications system and an access network.

The popularity of virtual reality (VR), augmented reality (AR), and mixed reality (MR) technologies is growing at a fast pace and may be widely adopted for applications other than gaming. There is an increase demand for XR devices (e.g., XR goggles or headsets) having high quality three-dimensional graphics, high video resolution, low latency responses, light weight, low power, and low costs, especially as XR usage is emerging in upcoming wireless systems. For XR devices, video encoding utilizes a high amount of resources, such as power consumption and latency, and decreasing the video encoding latency and processing overhead may allow XR devices to have an extended uptime or battery life.

Distributed video coding (DVC) based communication scheme may be configured to significantly reduce computation power as well as memory consumption at XR devices. DVC may reduce computational power due in part to a discrete cosine transform (DCT) utilizing a light compression module at both receiver and transmitter. In conventional HARQ mechanisms, in instances of a detection failure of one or more of the transmitted code blocks at the receiver side, a retransmission request (e.g., NACK message) may be sent to the transmitter. The transmitter will re-transmit the failed data with a different redundancy version. This HARQ mechanism is less suited for video applications due to the latency being uncertain while the video frame rate is constant which may pose a tight latency constraint.

An input signal of a digital encoder, for DVC, is the quantized video compression output of macroblocks. At a receiver side, the prediction quality/reliability varies between different bits. In some instances, prediction quality imbalances may be based on high to low motion macroblock, where the macroblock of video frame regions that experience high motion are harder to predict compared to a macroblock of a low motion regions.

Aspects presented herein provide a configuration for HARQ procedures for DVC. For example, HARQ procedures for DVC based communication scheme may be configured that may maintain a fixed HARQ latency, while having video quality vary due to channel and/or interference conditions. Aspects presented herein may further provide a configuration for an enhancement for imbalances of the prediction quality in DVC. For example, at least one enhancement may include a frame/region interleaver and optimized channel coding with respect to prediction quality.

The detailed description set forth below in connection with the drawings describes various configurations and does not represent the only configurations in which the concepts described herein may be practiced. The detailed description includes specific details for the purpose of providing a thorough understanding of various concepts. However, these concepts may be practiced without these specific details. In some instances, well known structures and components are shown in block diagram form in order to avoid obscuring such concepts.

Several aspects of telecommunication systems are presented with reference to various apparatus and methods. These apparatus and methods are described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. When multiple processors are implemented, the multiple processors may perform the functions individually or in combination. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software, whether referred to as software, firmware, middleware, microcode, hardware description language, or otherwise, shall be construed broadly to mean instructions, instruction sets, code, code segments, program code, programs, subprograms, software components, applications, software applications, software packages, routines, subroutines, objects, executables, threads of execution, procedures, functions, or any combination thereof.

Accordingly, in one or more example aspects, implementations, and/or use cases, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, such computer-readable media can include a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects, implementations, and/or use cases are described in this application by illustration to some examples, additional or different aspects, implementations and/or use cases may come about in many different arrangements and scenarios. Aspects, implementations, and/or use cases described herein may be implemented across many differing platform types, devices, systems, shapes, sizes, and packaging arrangements. For example, aspects, implementations, and/or use cases may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described examples may occur. Aspects, implementations, and/or use cases may range a spectrum from chip-level or modular components to non-modular, non-chip-level implementations and further to aggregate, distributed, or original equipment manufacturer (OEM) devices or systems incorporating one or more techniques herein. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). Techniques described herein may be practiced in a wide variety of devices, chip-level components, systems, distributed arrangements, aggregated or disaggregated components, end-user devices, etc. of varying sizes, shapes, and constitution.

Deployment of communication systems, such as 5G NR systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmission reception point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU can be implemented as virtual units, i.e., a virtual central unit (VCU), a virtual distributed unit (VDU), or a virtual radio unit (VRU).

Base station operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

FIG. 1 is a diagram 100 illustrating an example of a wireless communications system and an access network. The illustrated wireless communications system includes a disaggregated base station architecture. The disaggregated base station architecture may include one or more CUs 110 that can communicate directly with a core network 120 via a backhaul link, or indirectly with the core network 120 through one or more disaggregated base station units (such as a Near-Real Time (Near-RT) RAN Intelligent Controller (RIC) 125 via an E2 link, or a Non-Real Time (Non-RT) RIC 115 associated with a Service Management and Orchestration (SMO) Framework 105, or both). A CU 110 may communicate with one or more DUs 130 via respective midhaul links, such as an F1 interface. The DUs 130 may communicate with one or more RUs 140 via respective fronthaul links. The RUs 140 may communicate with respective UEs 104 via one or more radio frequency (RF) access links. In some implementations, the UE 104 may be simultaneously served by multiple RUs 140.

Each of the units, i.e., the CUS 110, the DUs 130, the RUs 140, as well as the Near-RT RICs 125, the Non-RT RICs 115, and the SMO Framework 105, may include one or more interfaces or be coupled to one or more interfaces configured to receive or to transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or to transmit signals over a wired transmission medium to one or more of the other units. Additionally, the units can include a wireless interface, which may include a receiver, a transmitter, or a transceiver (such as an RF transceiver), configured to receive or to transmit signals, or both, over a wireless transmission medium to one or more of the other units.

In some aspects, the CU 110 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 110. The CU 110 may be configured to handle user plane functionality (i.e., Central Unit-User Plane (CU-UP)), control plane functionality (i.e., Central Unit-Control Plane (CU-CP)), or a combination thereof. In some implementations, the CU 110 can be logically split into one or more CU-UP units and one or more CU-CP units. The CU-UP unit can communicate bidirectionally with the CU-CP unit via an interface, such as an E1 interface when implemented in an O-RAN configuration. The CU 110 can be implemented to communicate with the DU 130, as necessary, for network control and signaling.

The DU 130 may correspond to a logical unit that includes one or more base station functions to control the operation of one or more RUs 140. In some aspects, the DU 130 may host one or more of a radio link control (RLC) layer, a medium access control (MAC) layer, and one or more high physical (PHY) layers (such as modules for forward error correction (FEC) encoding and decoding, scrambling, modulation, demodulation, or the like) depending, at least in part, on a functional split, such as those defined by 3GPP. In some aspects, the DU 130 may further host one or more low PHY layers. Each layer (or module) can be implemented with an interface configured to communicate signals with other layers (and modules) hosted by the DU 130, or with the control functions hosted by the CU 110.

Lower-layer functionality can be implemented by one or more RUs 140. In some deployments, an RU 140, controlled by a DU 130, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 140 can be implemented to handle over the air (OTA) communication with one or more UEs 104. In some implementations, real-time and non-real-time aspects of control and user plane communication with the RU(s) 140 can be controlled by the corresponding DU 130. In some scenarios, this configuration can enable the DU(s) 130 and the CU 110 to be implemented in a cloud-based RAN architecture, such as a vRAN architecture.

The SMO Framework 105 may be configured to support RAN deployment and provisioning of non-virtualized and virtualized network elements. For non-virtualized network elements, the SMO Framework 105 may be configured to support the deployment of dedicated physical resources for RAN coverage requirements that may be managed via an operations and maintenance interface (such as an O1 interface). For virtualized network elements, the SMO Framework 105 may be configured to interact with a cloud computing platform (such as an open cloud (O-Cloud) 190) to perform network element life cycle management (such as to instantiate virtualized network elements) via a cloud computing platform interface (such as an O2 interface). Such virtualized network elements can include, but are not limited to, CUs 110, DUs 130, RUs 140 and Near-RT RICs 125. In some implementations, the SMO Framework 105 can communicate with a hardware aspect of a 4G RAN, such as an open eNB (O-eNB) 111, via an O1 interface. Additionally, in some implementations, the SMO Framework 105 can communicate directly with one or more RUs 140 via an O1 interface. The SMO Framework 105 also may include a Non-RT RIC 115 configured to support functionality of the SMO Framework 105.

The Non-RT RIC 115 may be configured to include a logical function that enables non-real-time control and optimization of RAN elements and resources, artificial intelligence (AI)/machine learning (ML) (AI/ML) workflows including model training and updates, or policy-based guidance of applications/features in the Near-RT RIC 125. The Non-RT RIC 115 may be coupled to or communicate with (such as via an A1 interface) the Near-RT RIC 125. The Near-RT RIC 125 may be configured to include a logical function that enables near-real-time control and optimization of RAN elements and resources via data collection and actions over an interface (such as via an E2 interface) connecting one or more CUs 110, one or more DUs 130, or both, as well as an O-eNB, with the Near-RT RIC 125.

In some implementations, to generate AI/ML models to be deployed in the Near-RT RIC 125, the Non-RT RIC 115 may receive parameters or external enrichment information from external servers. Such information may be utilized by the Near-RT RIC 125 and may be received at the SMO Framework 105 or the Non-RT RIC 115 from non-network data sources or from network functions. In some examples, the Non-RT RIC 115 or the Near-RT RIC 125 may be configured to tune RAN behavior or performance. For example, the Non-RT RIC 115 may monitor long-term trends and patterns for performance and employ AI/ML models to perform corrective actions through the SMO Framework 105 (such as reconfiguration via O1) or via creation of RAN management policies (such as A1 policies).

At least one of the CU 110, the DU 130, and the RU 140 may be referred to as a base station 102. Accordingly, a base station 102 may include one or more of the CU 110, the DU 130, and the RU 140 (each component indicated with dotted lines to signify that each component may or may not be included in the base station 102). The base station 102 provides an access point to the core network 120 for a UE 104. The base station 102 may include macrocells (high power cellular base station) and/or small cells (low power cellular base station). The small cells include femtocells, picocells, and microcells. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links between the RUs 140 and the UEs 104 may include uplink (UL) (also referred to as reverse link) transmissions from a UE 104 to an RU 140 and/or downlink (DL) (also referred to as forward link) transmissions from an RU 140 to a UE 104. The communication links may use multiple-input and multiple-output (MIMO) antenna technology, including spatial multiplexing, beamforming, and/or transmit diversity. The communication links may be through one or more carriers. The base station 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL wireless wide area network (WWAN) spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, Bluetooth™ (Bluetooth is a trademark of the Bluetooth Special Interest Group (SIG)), Wi-Fi™ (Wi-Fi is a trademark of the Wi-Fi Alliance) based on the Institute of Electrical and Electronics Engineers (IEEE) 802.11 standard, LTE, or NR.

The wireless communications system may further include a Wi-Fi AP 150 in communication with UEs 104 (also referred to as Wi-Fi stations (STAs)) via communication link 154, e.g., in a 5 GHz unlicensed frequency spectrum or the like. When communicating in an unlicensed frequency spectrum, the UEs 104/AP 150 may perform a clear channel assessment (CCA) prior to communicating in order to determine whether the channel is available.

The electromagnetic spectrum is often subdivided, based on frequency/wavelength, into various classes, bands, channels, etc. In 5G NR, two initial operating bands have been identified as frequency range designations FR1 (410 MHz-7.125 GHZ) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR2-2 (52.6 GHZ-71 GHz), FR4 (71 GHz-114.25 GHz), and FR5 (114.25 GHz-300 GHz). Each of these higher frequency bands falls within the EHF band.

With the above aspects in mind, unless specifically stated otherwise, the term "sub-6 GHz" or the like if used herein may broadly represent frequencies that may be less than 6 GHZ, may be within FR1, or may include mid-band frequencies. Further, unless specifically stated otherwise, the term "millimeter wave" or the like if used herein may broadly represent frequencies that may include mid-band frequencies, may be within FR2, FR4, FR2-2, and/or FR5, or may be within the EHF band.

The base station 102 and the UE 104 may each include a plurality of antennas, such as antenna elements, antenna panels, and/or antenna arrays to facilitate beamforming. The base station 102 may transmit a beamformed signal 182 to the UE 104 in one or more transmit directions. The UE 104 may receive the beamformed signal from the base station 102 in one or more receive directions. The UE 104 may also transmit a beamformed signal 184 to the base station 102 in one or more transmit directions. The base station 102 may receive the beamformed signal from the UE 104 in one or more receive directions. The base station 102/UE 104 may perform beam training to determine the best receive and transmit directions for each of the base station 102/UE 104. The transmit and receive directions for the base station 102 may or may not be the same. The transmit and receive directions for the UE 104 may or may not be the same.

The base station 102 may include and/or be referred to as a gNB, Node B, eNB, an access point, a base transceiver station, a radio base station, a radio transceiver, a transceiver function, a basic service set (BSS), an extended service set (ESS), a TRP, network node, network entity, network equipment, or some other suitable terminology. The base station 102 can be implemented as an integrated access and backhaul (IAB) node, a relay node, a sidelink node, an aggregated (monolithic) base station with a baseband unit (BBU) (including a CU and a DU) and an RU, or as a disaggregated base station including one or more of a CU, a DU, and/or an RU. The set of base stations, which may include disaggregated base stations and/or aggregated base stations, may be referred to as next generation (NG) RAN (NG-RAN).

The core network 120 may include an Access and Mobility Management Function (AMF) 161, a Session Management Function (SMF) 162, a User Plane Function (UPF) 163, a Unified Data Management (UDM) 164, one or more location servers 168, and other functional entities. The AMF 161 is the control node that processes the signaling between the UEs 104 and the core network 120. The AMF 161 supports registration management, connection management, mobility management, and other functions. The SMF 162 supports session management and other functions. The UPF 163 supports packet routing, packet forwarding, and other functions. The UDM 164 supports the generation of authentication and key agreement (AKA) credentials, user identification handling, access authorization, and subscription management. The one or more location servers 168 are illustrated as including a Gateway Mobile Location Center (GMLC) 165 and a Location Management Function (LMF) 166. However, generally, the one or more location servers 168 may include one or more location/positioning servers, which may include one or more of the GMLC 165, the LMF 166, a position determination entity (PDE), a serving mobile location center (SMLC), a mobile positioning center (MPC), or the like. The GMLC 165 and the LMF 166 support UE location services. The GMLC 165 provides an interface for clients/applications (e.g., emergency services) for accessing UE positioning information. The LMF 166 receives measurements and assistance information from the NG-RAN and the UE 104 via the AMF 161 to compute the position of the UE 104. The NG-RAN may utilize one or more positioning methods in order to determine the position of the UE 104. Positioning the UE 104 may involve signal measurements, a position estimate, and an optional velocity computation based on the measurements. The signal measurements may be made by the UE 104 and/or the base station 102 serving the UE 104. The signals measured may be based on one or more of a satellite positioning system (SPS) 170 (e.g., one or more of a Global Navigation Satellite System (GNSS), global position system (GPS), non-terrestrial network (NTN), or other satellite position/location system), LTE signals, wireless local area network (WLAN) signals, Bluetooth signals, a terrestrial beacon system (TBS), sensor-based information (e.g., barometric pressure sensor, motion sensor), NR enhanced cell ID (NR E-CID) methods, NR signals (e.g., multi-round trip time (Multi-RTT), DL angle-of-departure (DL-AoD), DL time difference of arrival (DL-TDOA), UL time difference of arrival (UL-TDOA), and UL angle-of-arrival (UL-AoA) positioning), and/or other systems/signals/sensors.

Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the UE 104 may comprise a payload component 198 that may be configured to sort one or more bits of a payload based on a corresponding priority; divide the payload into one or more groups based on the corresponding priority, wherein each of the one or more groups is encoded separately; and transmit, to a second wireless device, a video frame over a span of one or more slots based at least on a prioritized transmission of the one or more groups. In certain aspects, the payload component 198 may be configured to perform a prediction enhancement of a video compression output, wherein the prediction enhancement is based at least on an interleave operation or a code block order operation; and transmit, to a second wireless device, encoded systematic bits of a video frame comprising an imbalance enhancement of a prediction quality based on the prediction enhancement.

Referring again to FIG. 1, in certain aspects, the base station 102 or UE 104 may comprise a payload component 199 that may be configured to receive, from a first wireless device, a video frame over a span of one or more slots based at least on a prioritized transmission of one or more groups of a divided payload; and transmit, to the second wireless device, an acknowledgement (ACK) or non-acknowledgment (NACK) of reception of the video frame, wherein transmission of the video frame is based on the prioritized transmission or a prioritized retransmission of the one or more groups having a higher priority over the one or more groups having a lower priority. In certain aspects, the payload component 199 may be configured to receive, from a first wireless device, encoded systematic bits of a video frame comprising an imbalance enhancement of a prediction quality based on a prediction enhancement, wherein the prediction enhancement is based at least on an interleave operation or a code block order operation; and perform a complementary prediction enhancement procedure comprising at least one of a de-interleave operation or a code block de-order operation on decoded systematic bits of the video frame to predict content of one or more subsequent video frames based on a previously received video frame.

Although the following description may be focused on 5G NR, the concepts described herein may be applicable to other similar areas, such as LTE, LTE-A, CDMA, GSM, and other wireless technologies.

Figure 2:
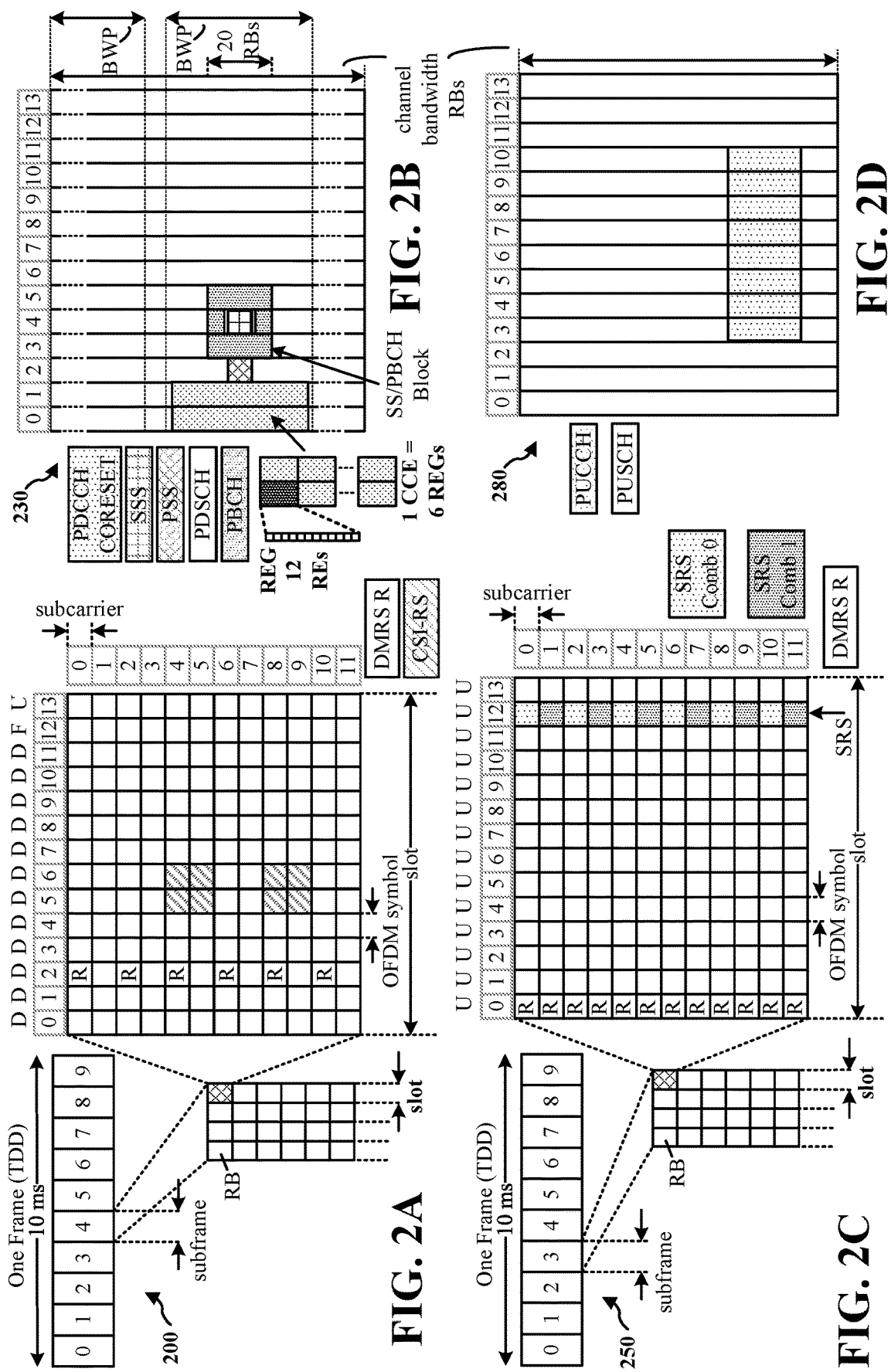
FIG. 2A is a diagram illustrating an example of a first frame, in accordance with various aspects of the present disclosure.
FIG. 2B is a diagram illustrating an example of downlink (DL) channels within a subframe, in accordance with various aspects of the present disclosure.
FIG. 2C is a diagram illustrating an example of a second frame, in accordance with various aspects of the present disclosure.
FIG. 2D is a diagram illustrating an example of uplink (UL) channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (for power limited scenarios; limited to a single stream transmission). The number of slots within a subframe is based on the CP and the numerology. The numerology defines the subcarrier spacing (SCS) (see Table 1). The symbol length/duration may scale with 1/SCS.

TABLE 1

Numerology, SCS, and CP

| μ | SCS Δf = $2^\mu \cdot 15$[kHz] | Cyclic prefix |
|---|---|---|
| 0 | 15 | Normal |
| 1 | 30 | Normal |

TABLE 1-continued

Numerology, SCS, and CP

| $\mu$ | SCS $\Delta f = 2^\mu \cdot 15$[kHz] | Cyclic prefix |
|---|---|---|
| 2 | 60 | Normal, Extended |
| 3 | 120 | Normal |
| 4 | 240 | Normal |
| 5 | 480 | Normal |
| 6 | 960 | Normal |

For normal CP (14 symbols/slot), different numerologies $\mu$ 0 to 4 allow for 1, 2, 4, 8, and 16 slots, respectively, per subframe. For extended CP, the numerology 2 allows for 4 slots per subframe. Accordingly, for normal CP and numerology $\mu$, there are 14 symbols/slot and $2^\mu$ slots/subframe. The subcarrier spacing may be equal to $2^\mu * 15$ kHz, where u is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of normal CP with 14 symbols per slot and numerology $\mu=2$ with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
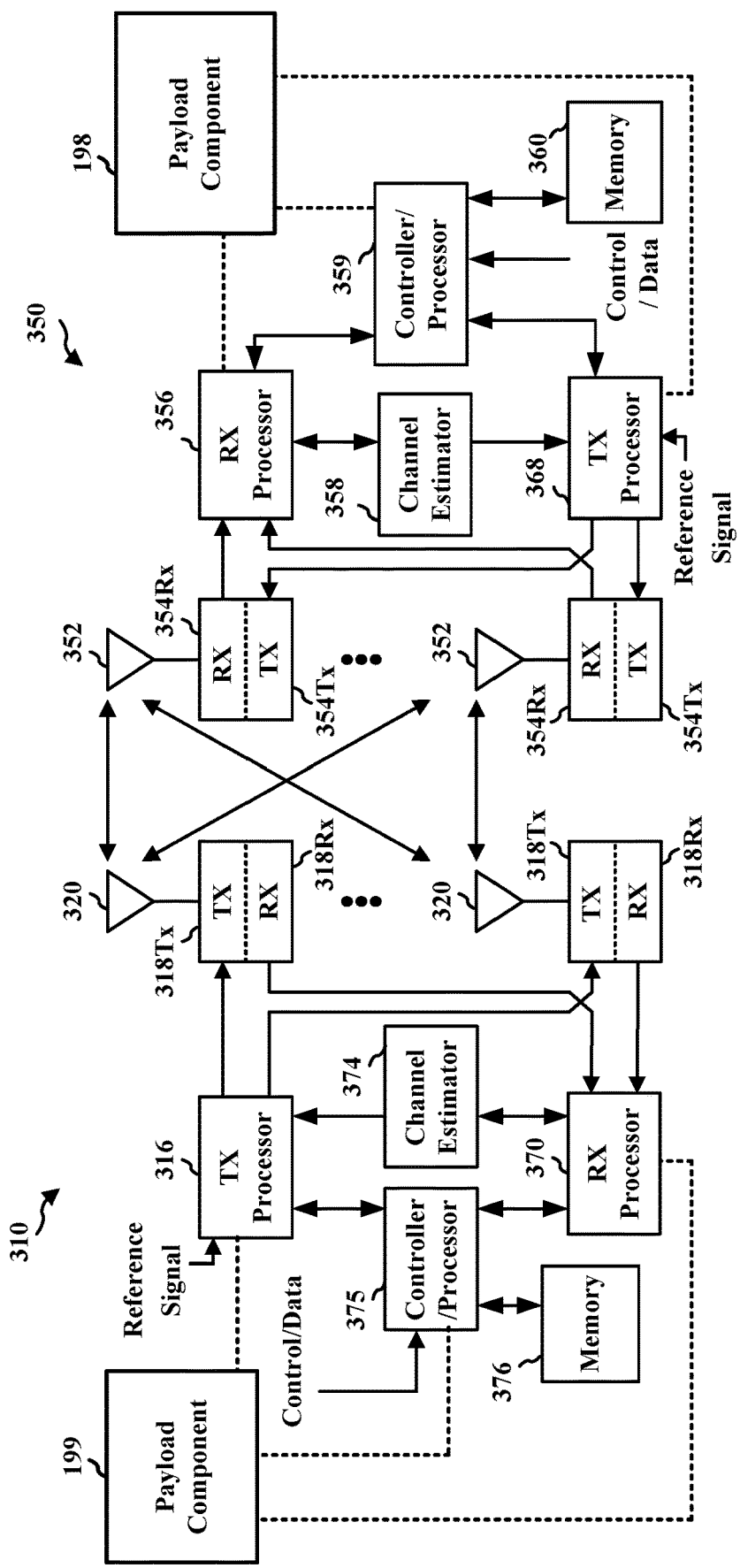
FIG. 3 is a diagram illustrating an example of a base station and user equipment (UE) in an access network.

FIG. 3 is a block diagram of a base station 310 in communication with a UE 350 in an access network. In the DL, Internet protocol (IP) packets may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318Tx. Each transmitter 318Tx may modulate a radio frequency (RF) carrier with a respective spatial stream for transmission.

At the UE 350, each receiver 354Rx receives a signal through its respective antenna 352. Each receiver 354Rx recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with at least one memory 360 that stores program codes and data. The at least one memory 360 may be referred to as a computer-readable medium. In the UL, the controller/processor 359 provides demultiplexing between transport and logical channels, packet reassembly, deciphering, header decompression, and control signal processing to recover IP packets. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354Tx. Each transmitter 354Tx may modulate an RF carrier with a respective spatial stream for transmission.

The UL transmission is processed at the base station 310 in a manner similar to that described in connection with the receiver function at the UE 350. Each receiver 318Rx receives a signal through its respective antenna 320. Each receiver 318Rx recovers information modulated onto an RF carrier and provides the information to a RX processor 370.

The controller/processor 375 can be associated with at least one memory 376 that stores program codes and data. The at least one memory 376 may be referred to as a computer-readable medium. In the UL, the controller/processor 375 provides demultiplexing between transport and logical channels, packet reassembly, deciphering, header decompression, control signal processing to recover IP packets. The controller/processor 375 is also responsible for error detection using an ACK and/or NACK protocol to support HARQ operations.

At least one of the TX processor 368, the RX processor 356, and the controller/processor 359 may be configured to perform aspects in connection with the payload component 198 of FIG. 1.

At least one of the TX processor 316, the RX processor 370, and the controller/processor 375 may be configured to perform aspects in connection with the payload component 199 of FIG. 1.

XR traffic may refer to wireless communications for technologies such as virtual reality (VR), mixed reality (MR), and/or augmented reality (AR). VR may refer to technologies in which a user is immersed in a simulated experience that is similar or different from the real world. A user may interact with a VR system through a VR headset or a multi-projected environment that generates realistic images, sounds, and other sensations that simulate a user's physical presence in a virtual environment. MR may refer to technologies in which aspects of a virtual environment and a real environment are mixed. AR may refer to technologies in which objects residing in the real world are enhanced via computer-generated perceptual information, sometimes across multiple sensory modalities, such as visual, auditory, haptic, somatosensory, and/or olfactory. An AR system may incorporate a combination of real and virtual worlds, real-time interaction, and accurate three-dimensional registration of virtual objects and real objects. In an example, an AR system may overlay sensory information (e.g., images) onto a natural environment and/or mask real objects from the natural environment. XR traffic may include video data and/or audio data. XR traffic may be transmitted by a base station and received by a UE or the XR traffic may be transmitted by a UE and received by a base station.

Figure 4A:
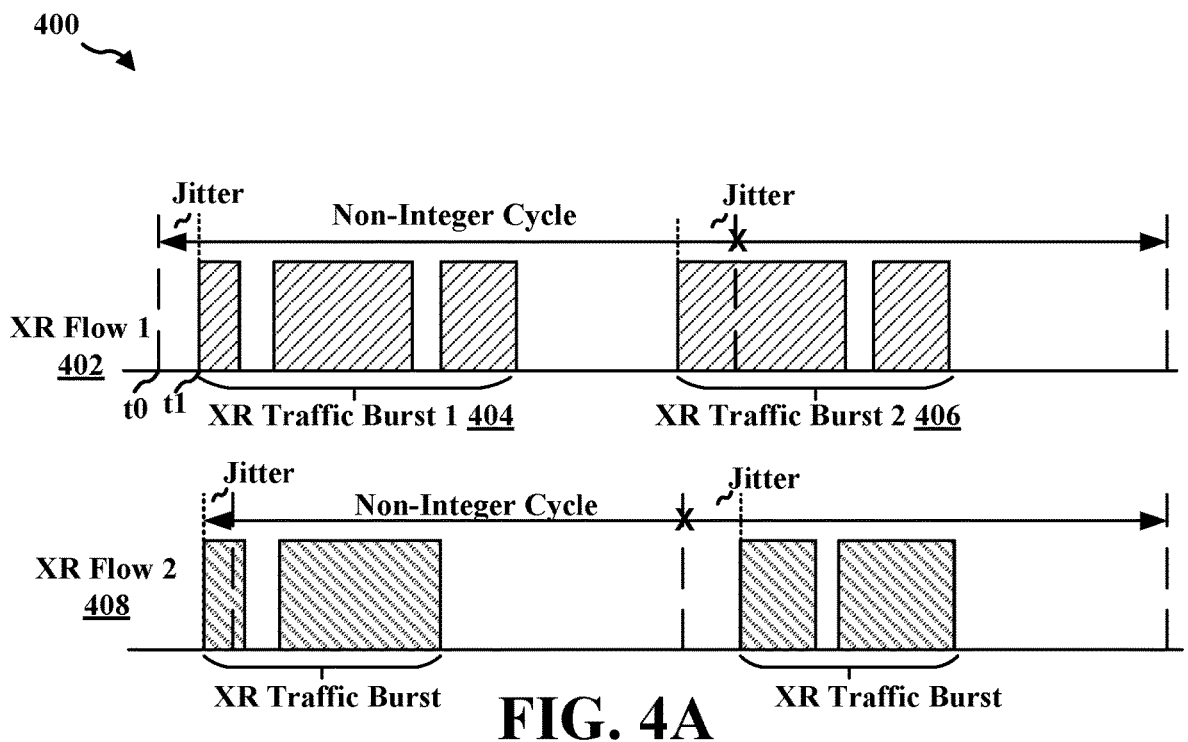
FIG. 4A is a diagram illustrating aspects of XR communication.

XR traffic may arrive in periodic traffic bursts ("XR traffic bursts"). An XR traffic burst may vary in a number of packets per burst and/or a size of each pack in the burst. FIG. 4A includes a diagram 400 illustrating a first XR flow 402 that includes a first XR traffic burst 404 and a second XR traffic burst 406. As illustrated in the diagram 400, the traffic bursts may include different numbers of packets, e.g., the first XR traffic burst 404 being shown with three packets (represented as rectangles in the diagram 400) and the second XR traffic burst 406 being shown with two packets. Furthermore, as illustrated in the diagram 400, the three packets in the first XR traffic burst 404 and the two packets in the second XR traffic burst 406 may vary in size, that is, packets within the first XR traffic burst 404 and the second XR traffic burst 406 may include varying amounts of data.

XR traffic bursts may arrive at non-integer periods (i.e., in a non-integer cycle). The periods may be different than an integer number of symbols, slots, etc. In an example, for 60 frames per second (FPS) video data, XR traffic bursts may arrive in $\frac{1}{60}$=16.67 ms periods. In another example, for 120 FPS video data, XR traffic bursts may arrive in $\frac{1}{120}$=8.33 ms periods.

Arrival times of XR traffic may vary. For example, XR traffic bursts may arrive and be available for transmission at a time that is earlier or later than a time at which a UE (or a base station) expects the XR traffic bursts. The variability of the packet arrival relative to the period (e.g., 16.76 ms period, 8.33 ms period, etc.) may be referred to as "jitter." In an example, jitter for XR traffic may range from −4 ms (earlier than expected arrival) to +4 ms (later than expected arrival). For instance, referring to the first XR flow 402, a UE may expect a first packet of the first XR traffic burst 404 to arrive at time t0, but the first packet of the first XR traffic burst 404 arrives at time t1.

XR traffic may include multiple flows that arrive at a UE (or a base station) concurrently with one another (or within a threshold period of time). For instance, the diagram 400 includes a second XR flow 408. The second XR flow 408 may have different characteristics than the first XR flow 402. For instance, the second XR flow 408 may have XR traffic bursts with different numbers of packets, different sizes of packets, etc. In an example, the first XR flow 402 may include video data and the second XR flow 408 may include audio data for the video data. In another example, the first XR flow 402 may include intra-coded picture frames (I-frames) that include complete images and the second XR flow 408 may include predicted picture frames (P-frames) that include changes from a previous image.

Figure 4B:
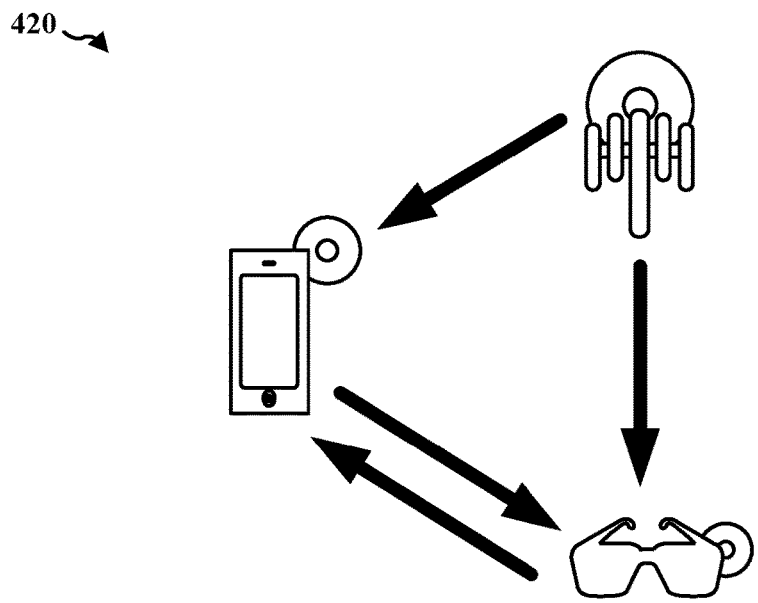
FIG. 4B is a diagram of wireless communications of XR devices.

The popularity of VR, AR, and MR technologies is growing at a fast pace and may be widely adopted for applications other than gaming, such as but not limited to healthcare, education, social, retail, and many more. There is an increase demand for XR devices (e.g., XR goggles or headsets), as shown for example in diagram 420 of FIG. 4B, having high quality three-dimensional graphics, high video resolution, low latency responses, light weight, low power, and low costs, especially as XR usage is emerging in upcoming wireless systems. For XR devices, video encoding utilizes a high amount of resources, such as power consumption and latency, and decreasing the video encoding latency and processing overhead may allow XR devices to have an extended uptime or battery life. In some XR devices, such as a lightweight XR device, high-quality-low-latency video may be supported while keeping low power processing on the XR device, by transferring most of the heavy processing to another source, which could be at the UE or cloud edge processing at a network entity.

Video encoders, such as H.264, H.265, or the like, operate on the basis of breaking each frame of a video (e.g., image) into sub-regions and then for each sub-region, the encoder may try several hypotheses (e.g., predictions) and the encoder may select the best or optimal hypothesis based on video quality and compression. The hypotheses may perform predictions in various formats. For example, some predictions may be based on adjacent pixels, temporal predictions based on images in time, and the like.

DVC based communication scheme may be configured to significantly reduce computation power as well as memory consumption at XR devices. DVC may reduce computational power due in part to a DCT utilizing a light compression module at both receiver and transmitter. In conventional HARQ mechanisms, in instances of a detection failure of one or more of the transmitted code blocks at the receiver side, a retransmission request (e.g., NACK message) may be sent to the transmitter. The transmitter will re-transmit the failed data with a different redundancy version. This HARQ mechanism is less suited for video applications due to the latency being uncertain while the video frame rate is constant which may pose a tight latency constraint. For example, the required number of retransmissions may vary over time due to channel and/or interference conditions and is hard to predict.

Figure 5:
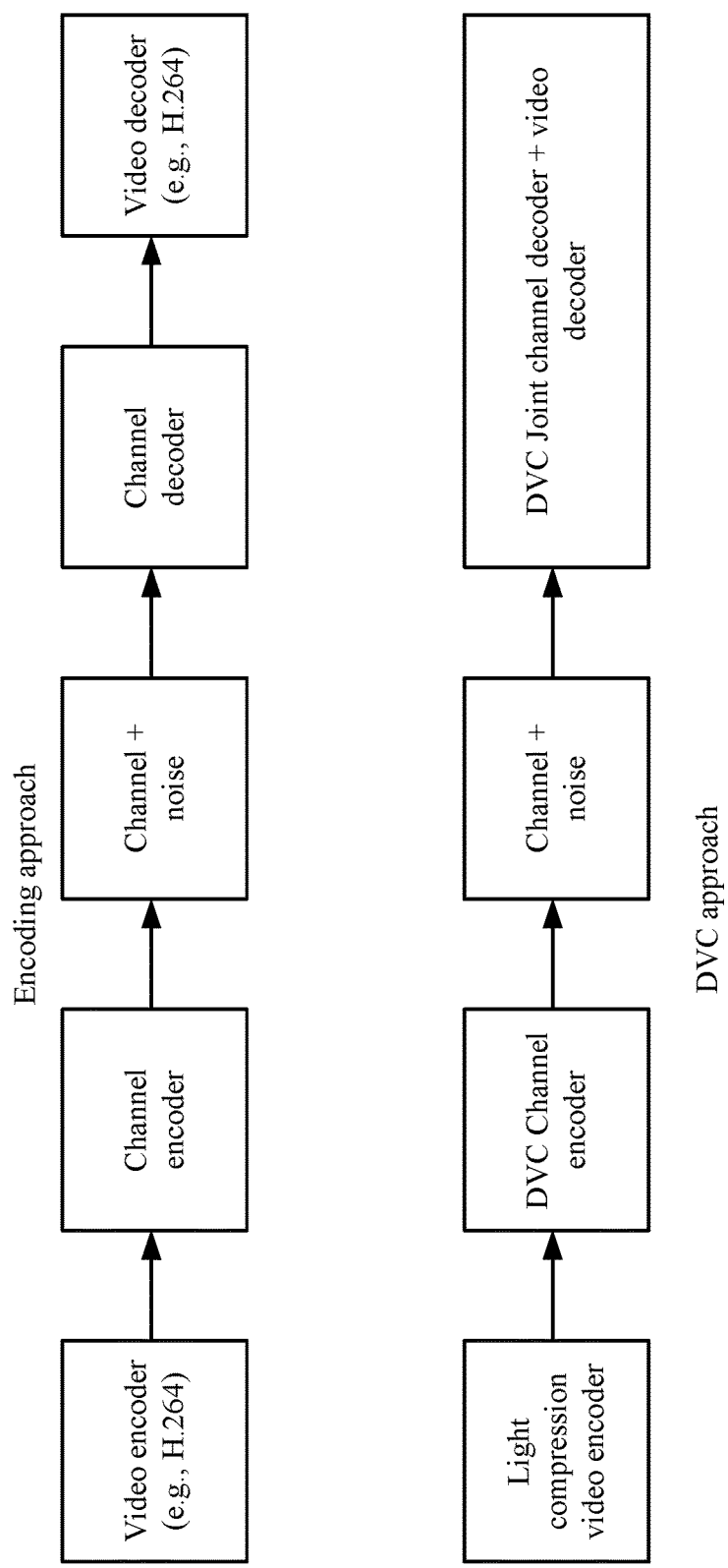
FIG. 5 is a diagram of a distributed video coding scheme.

In some instances, such as in DVC, the video encoder may be a complex component for an XR device, such that the video encoder has a high power consumption, or may introduce latency such that there is a tradeoff between compression ratio and latency. In DVC, the complexity of the video encoding may be performed by the video decoder. For example, video decoding may be performed at a receiver. With reference to diagram 500 of FIG. 5, a conventional approach may include a transmitter providing a video at a video encoder, a channel encoding at a channel encoder, transmission of the encoded channel plus noise, decoding of the channel at a channel decoder of a receiver, and then decoding of the encoded channel at a video decoder at the receiver. In a DVC approach, a transmitter may perform light compression at a video encoder, a DVC channel encoding at a DVC channel encoder, transmission of the encoded channel plus noise to the receiver where joint communication and video decoding is performed at a DVC joint channel decoder and video decoder of the receiver. In DVC, a light compression video encoder at a transmitter may utilize DCT based intraframe compression, which is a very low power processing in comparison to H.264 compression and may be performed "on the fly" or dynamically. Compression may be performed by a quantizing and transmitting some of the DCT coefficients. The DVC channel encoder may utilize a systematic code, such as but not limited to low-density parity check (LDPC). Rate matching (e.g., puncturing) may be performed based on anchor video frames (e.g., periodic or after error detection) or based on transmitting parity bits. The DVC channel decoder may utilize the prediction of a received video frame as a-priory information of the systematic bits jointly with the received parity bits of the received video frame for detection.

Figure 6:
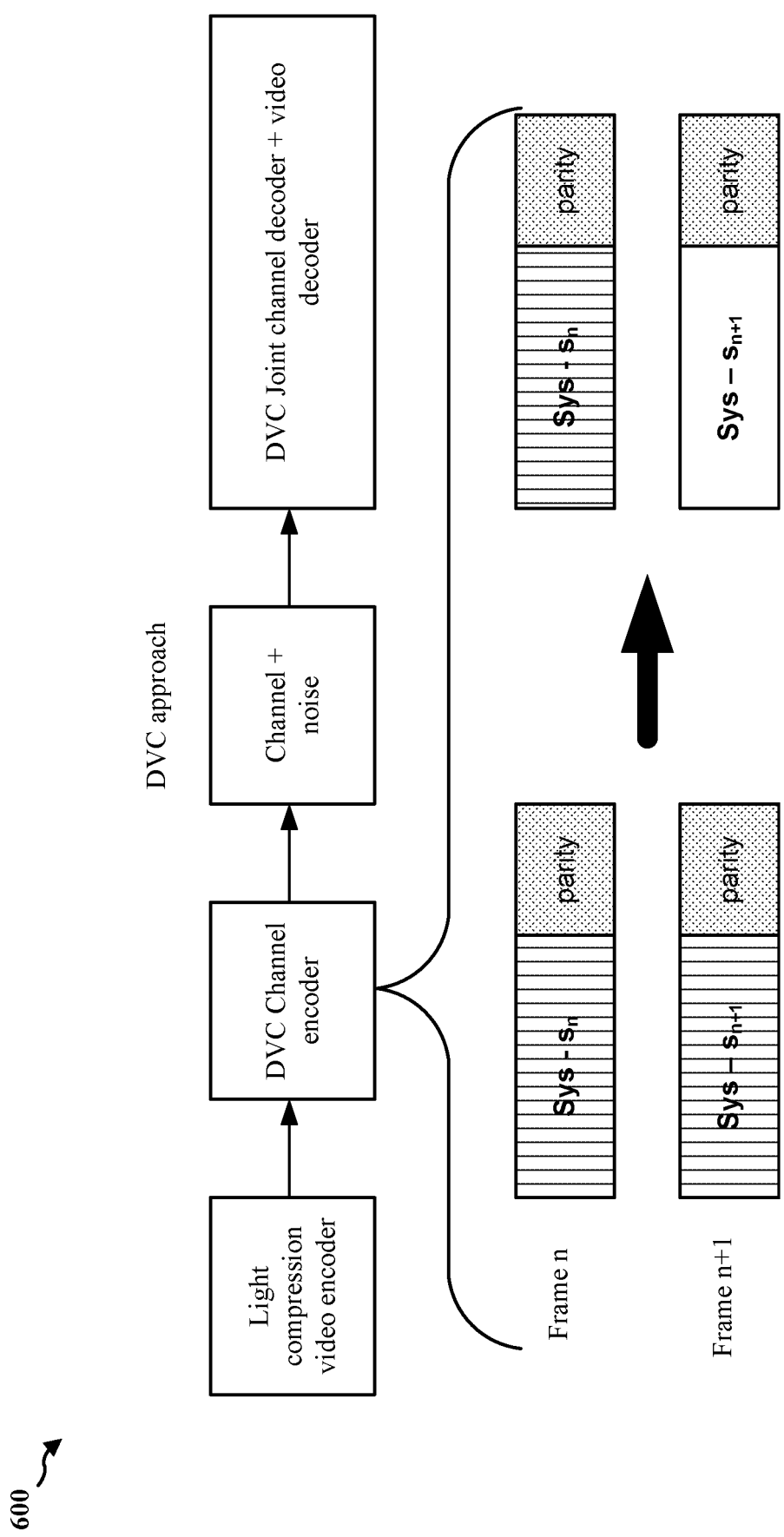
FIG. 6 is a diagram of a distributed video coding scheme.

With reference to diagram 600 of FIG. 6, a frame n is encoded using an error protecting code, such that parity bits are generated and transmitted to a receiver, such that the receiver may utilize the parity bits to decode the encoded data. The receiver may perform a CRC check on the received parity bits and if a CRC pass occurs, then the receiver properly received the parity bits. In DVC, with regards to sending the next frame (e.g., frame n+1), instead of sending all the information (e.g., systematic bits and parity bits), it can be assumed that the adjacent frame is very close to the previous frame, such that only the parity bits are transmitted based under the assumption at the receiver that the systematic bits are the same as the previous frame (e.g., frame n). In some instances, the transmitter may transmit some of the systematic bits in addition to the parity bits, while in some instances, the transmitter may not transmit any of the systematic bits but may, at most, transmit at least some of the parity bits. Channel conditions and the dynamic features of the video may determine whether systematic bits and/or parity bits are transmitted. For example, for static video, less systematic bits and less parity bits may be transmitted due in part to the static nature of the video resulting in favorable channel conditions which may allow for less parity bits being transmitted. The image within the frame may have changed between frame n and frame n+1, but if the difference is not significant, then the error correcting code may treat those differences as errors, and use the parity bits to recover the entirety of the frame (e.g., frame n+1). As such, a subset of the data may be utilized to recover the frame without transmission of the entirety of the next frame (e.g., frame n+1), which may reduce overhead.

Figure 7:
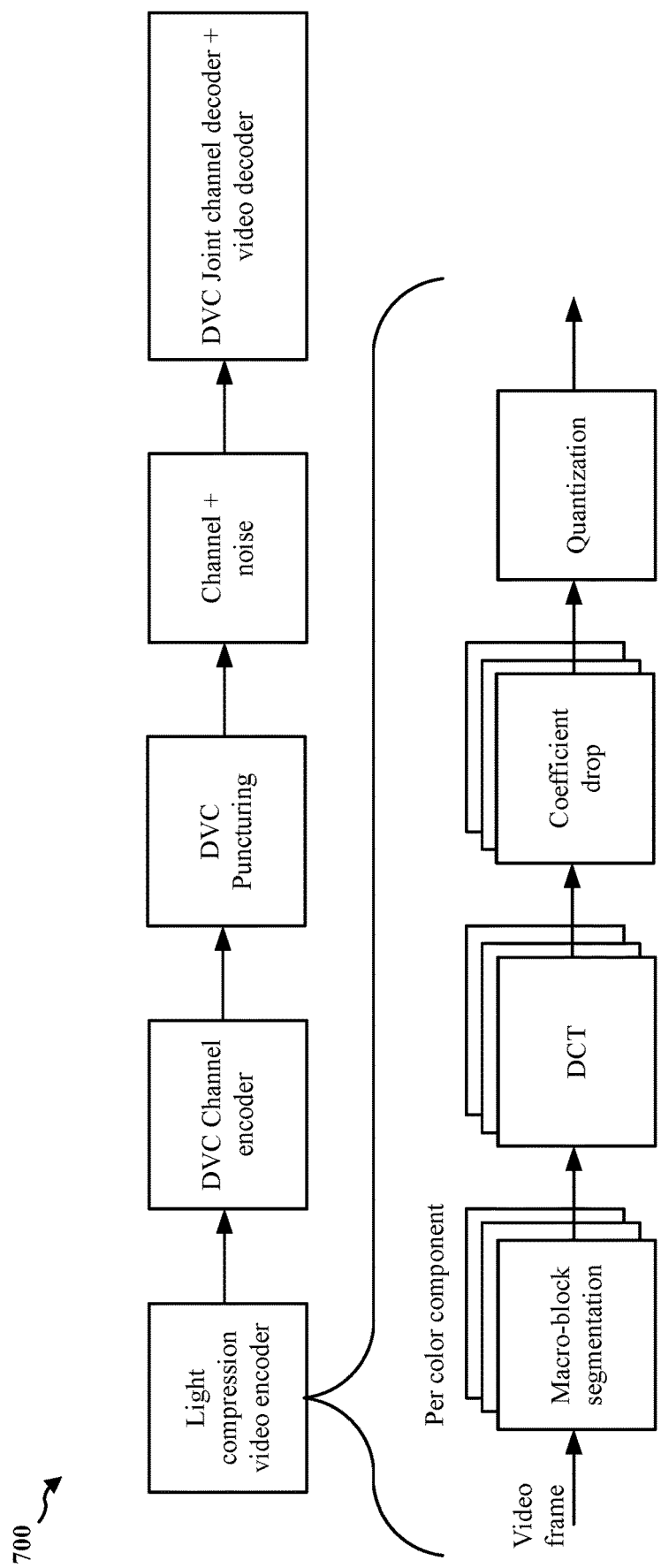
FIG. 7 is a diagram of a distributed video coding scheme.

With reference to diagram 700 of FIG. 7, the input signal of the digital encoder (e.g., systematic bits) are the quantized video compression output, for example, DCT coefficients of the macroblocks. At the receiver side, the prediction quality/reliability varies between different bits. In some instances, prediction quality imbalances may be based on most significant bit (MSB) to least significant bit (LSB), where MSB are easier to predict than LSB as different values in MSB translates to higher Euclidian distance in the video frame domain. In some instances, prediction quality imbalances may be based on high to low motion macroblock, where the macroblock of video frame regions that experience high motion are harder to predict compared to a macroblock of a low motion regions.

Aspects presented herein provide a configuration for HARQ procedures for DVC. For example, HARQ procedures for DVC based communication scheme may be configured that may maintain a fixed HARQ latency, while having video quality vary due to channel and/or interference conditions. At least one advantage of the disclosure is that a fixed HARQ latency may be maintained while having the video quality vary due to channel and/or interference conditions. Aspects presented herein may further provide a configuration for an enhancement for imbalances of the prediction quality in DVC. For example, at least one enhancement may include a frame/region interleaver and optimized channel coding with respect to prediction quality.

In some aspects, the disclosure may be configured to keep a fixed number of potential retransmissions slots per video frame and use the slots for retransmission of failed code blocks, which may be considered as having a higher priority. In instances of successful decoding, the slots will be used for transmission of lower priority code blocks.

In some aspects, the transmitter may sort the payload bits according to their significance. For example, sorting may be based on at least one of bit position (e.g., MSB vs. LSB), DCT coefficient index (e.g., low frequency vs. high frequency), color component (e.g., luma vs. chroma), segments of interest in the frame (e.g., foreground vs. background, in-focus area vs. out-of-focus area, etc.), or segments of motion (e.g., high motion vs. low motion). The transmitter may divide the payload into M groups of significant (e.g., from the most significant to the least significant), and separately encode each group. The transmitter may define per group the MCS per transmission. Transmission of a video frame may span over K slots by prioritizing transmission (or re-transmission) of higher significance groups. In case of available resources, such available resources may be used for transmission (or re-transmission) of lower significance groups.

The transmitter may be configured to provide signaling information to the receiver. For example, the transmitter may indicate a payload sorting parameter that indicates attributes used by the transmitter for the sorting and the order. The payload sorting parameter may be transmitted based on a low periodicity or static periodicity. The transmitter may indicate a number of priority groups (M). The number of priority groups may be transmitted based on a low periodicity or static periodicity. The transmitted may indicate a number of slots per video frame (K). The number of slots per video frame may be transmitted based on a low periodicity. The transmitter may indicate the MCS per groups, per re-transmission. The MCS per groups may be transmitted based on a high periodicity. In some aspects, the signaling information may be transmitted via RRC signaling, MAC-CE, or DCI.

Figure 8:
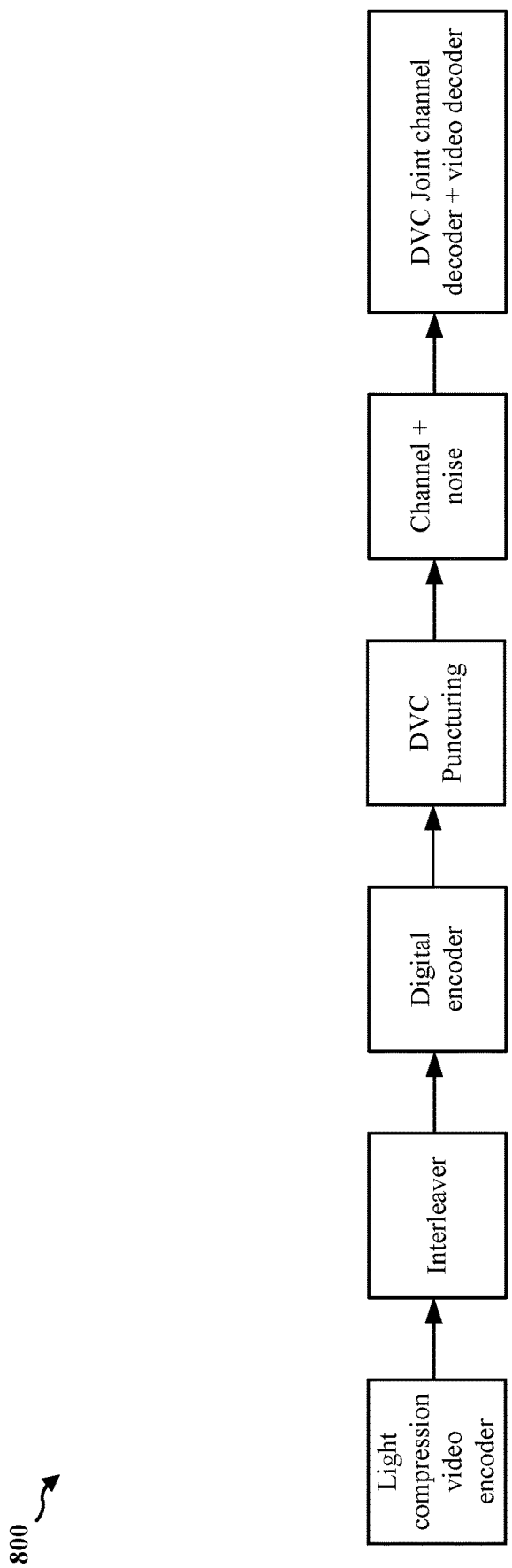
FIG. 8 is a diagram of a distributed video coding scheme.

In some aspects, for example, an interleaver may be added before the digital encoder, as shown for example in diagram 800 of FIG. 8. The interleaver being before the digital encoder may evenly distribute the systematic bits over all code blocks. Each code block may have the same or substantially similar distribution of predictions qualities. This may ensure a similar detection performance across all code blocks. In order to reduce memory consumption, as well as latency, the interleaver may be operate on a specific region of the video frame. The interleaver may involve multiple video stream from multiple components utilizing videos correlations. The interleaver parameters may comprise video frame regions of interleaving (e.g., number of rows, number of columns, color components, used videos/cameras) or an interleaving order/pattern. The interleaver parameters may be coordinated between the transmitter and the receiver. In some aspects, the interleaver parameters may be preconfigured. In some aspects, the interleaver parameters may comprise several sets of preconfigured parameters, where the transmitter transmits an indication (e.g., index) that corresponds to at least one of the sets of preconfigured parameters. In some aspects, the interleaver parameters may be indicated by the transmitter.

Figure 9:
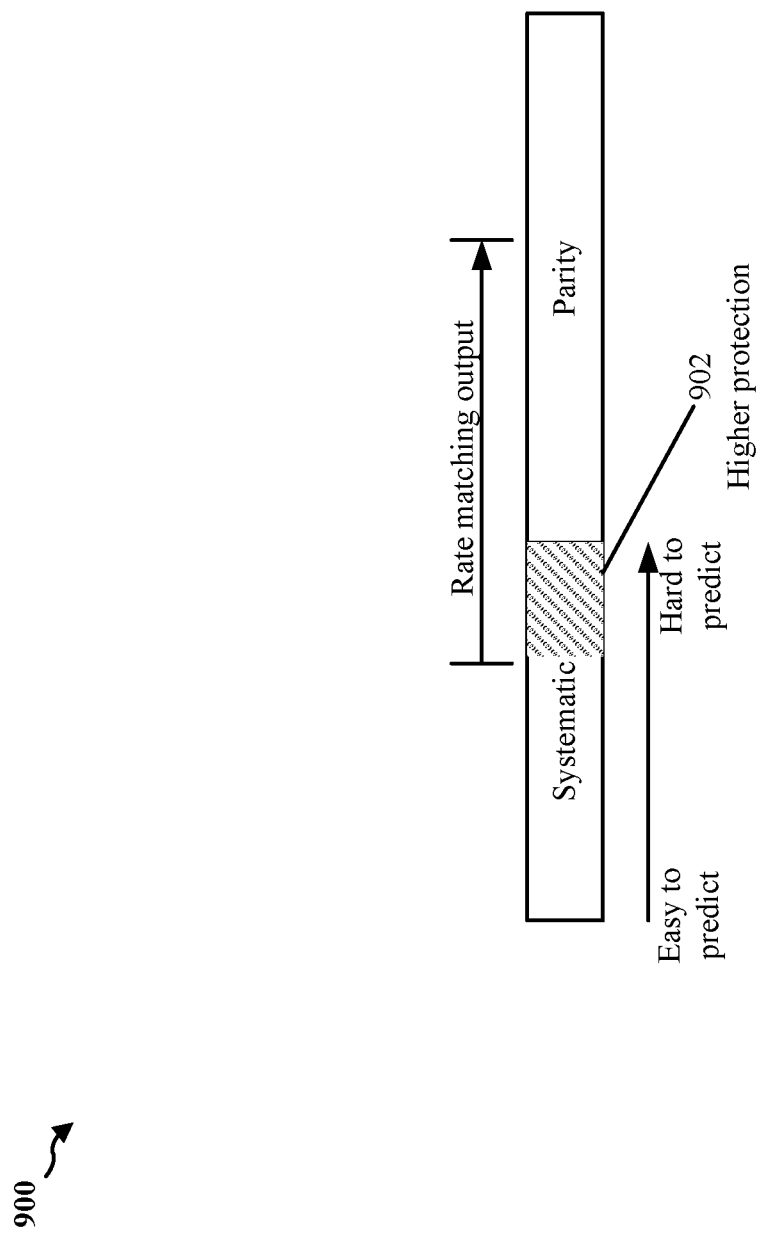
FIG. 9 is a diagram of a rate matching offset of systematic bits.

In some aspects, the imbalances of the prediction quality between different bits may be handled by unequal protection for different bits. For example, the bits may be ordered per code block based on an expected prediction quality (e.g., best reliability). The ordering of the bits may be from the bits having the highest reliability (e.g., bits that are easiest for prediction) to the bits having the worst reliability (e.g., bits that are hardest for prediction). For example, in some aspects, all MSBs may be ordered before the LSBs. A rate matching offset may then be determined such that a desired amount of the last systematic bits 902 (e.g., the bits which are hardest to predict) will also be communicated in the channel, as shown for example in diagram 900 of FIG. 9.

In some aspects, a different code may be dynamically selected, such that the code may be designed to equalize the protection of the systematic bits with respect to the prediction quality distribution. For example, the transmitter may dynamically select a different LDPC graph, from set of predefined graphs, with respect to the distribution of the prediction quality.

In some aspects, the following parameters may be coordinated between the transmitter and the receiver. For example, the ordering of the systematic bits by quality. Codebooks of different ordering may be preconfigured and the transmitter may provide and may provide an indication (e.g., index) corresponding to the selected ordering. A different ordering may be selected with respect to the frame region, for example, with respect to the region motion properties for example.

In some aspects, for a rate matching offset, the transmitter may select and indicate the rate matching offset at a desired granularity (e.g., video frame, group of code blocks, code block). The transmitter may determine the rate matching offset. In some aspects, different offsets may correspond to different code blocks/set of code blocks. The transmitter may transmit to the receiver an indication of the set of offset values selected by the transmitter.

In some aspects, a code/graph selection may be selected from a predefined set of graphs. The transmitter may select and indicate the graph (e.g., LDPC based) at a desired granularity based on a frame region, with respect to the region motion properties for example. The graphs may be determined based on a transport block size and/or the MCS. In some aspects, a plurality of graphs may be available for selection. In some aspects, the transmitter may select the graph based on a code block predictability (e.g., systematic bits quality). In some aspects, the transmitter may transmit, to the receiver, an indication that indicates the selection of graphs selected by the transmitter.

Figure 10:
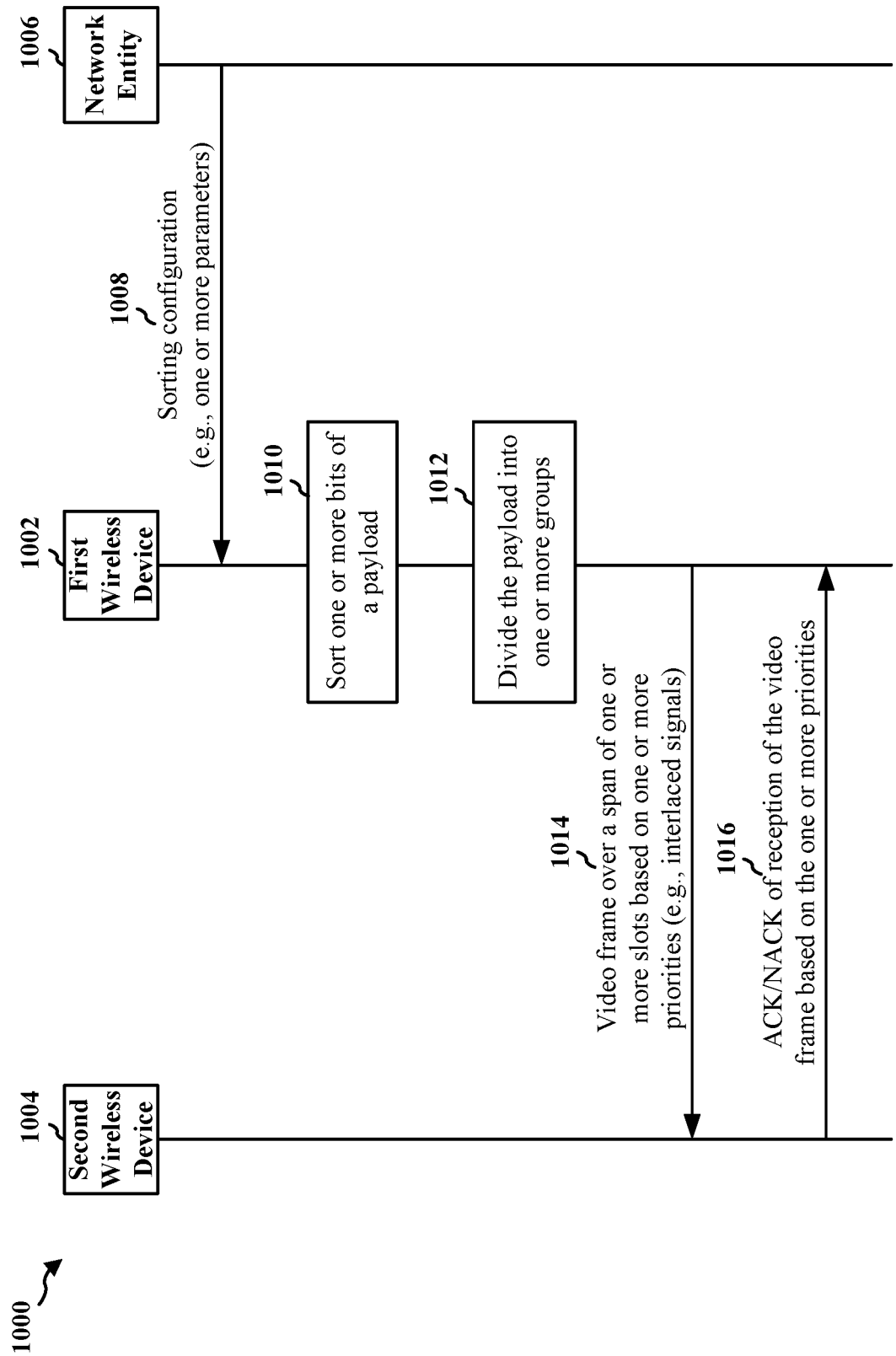
FIG. 10 is a call flow diagram of signaling between a first wireless device, a second wireless device, and a network entity.

FIG. 10 is a call flow diagram 1000 of signaling between a first wireless device 1002 and a second wireless device 1004. The first wireless device 1002 may be configured to communicate with the second wireless device 1004. For example, in the context of FIG. 1, the second wireless device 1004 may correspond to base station 102 or the UE 104, and the first wireless device 1002 may correspond to at least UE 104. In another example, in the context of FIG. 3, the second wireless device 1004 may correspond to base station 310 and the first wireless device 1002 may correspond to UE 350. In some aspects, the first wireless device 1002 may comprise an XR device (e.g., goggles, headset) or a UE, where the second wireless device may comprise a UE or a base station, such that the XR device (e.g., first wireless device) may communicate with the UE/base station (e.g., second wireless device).

At 1008, the first wireless device 1002 may receive, from a network entity 1006, a sorting configuration comprising one or more parameters. In some aspects, the one or more parameters may comprise at least one of payload sorting parameters, a number of priority groups, a number of slots per video frame, or a modulation and coding scheme per group or per retransmission. In some aspects, the sorting configuration may be received via at least one of RRC signaling, media access control (MAC) control element (CE) (MAC-CE), or DCI. In some aspects, the sorting configuration may be received periodically or aperiodically.

At 1010, the first wireless device 1002 may sort one or more bits of a payload based on a corresponding priority. In some aspects, the one or more bits of the payload may be sorted based on at least one of a bit position, a DCT coefficient index, a color component, one or more segments of interest in a frame, or one or more segments of motion in the frame.

At 1012, the first wireless device 1002 may divide the payload into one or more groups based on the corresponding priority. Each of the one or more groups may be encoded separately. In some aspects, division of the payload into the one or more groups may be based on a most significant group to a least significant group. In some aspects, each of the one or more groups may comprise a corresponding modulation and coding scheme (MCS) per transmission occasion.

At 1014, the first wireless device 1002 may transmit a video frame over a span of one or more slots. The first wireless device 1002 may transmit the video frame over the span of the one or more slots to a second wireless device 1004. The second wireless device 1004 may receive the video frame over the span of the one or more slots from the first wireless device 1002. The first wireless device may transmit the video frame over the span of the one or more slots based at least on a prioritized transmission of the one or more groups. In some aspects, transmission of the video frame may be based on the prioritized transmission or a prioritized retransmission of the one or more groups having a higher priority over the one or more groups having a lower priority. In some aspects, the transmission of the video frame may be comprised of one or more interlaced signals of video transmissions, where each of the one or more interlaced signals may have different priorities. For example, the interlaced signal may comprise a first video signal having a first priority, a second video signal having a second priority, and a third video signal having a third priority, where the first priority has a highest priority, followed by the second priority, and the third priority having the lowest priority. In some instances, the first wireless device 1002 may transmit the video frame comprised of the interlaced signal having the first video signal, the second video signal, and the third video signal, where transmission of the first video signal, the second video signal, and the third video signal is occurs in order based on priority. The second wireless device 1004 receives the video frame comprised of the interlaced signal having the first video signal and may determine to transmit an ACK or NACK for the first video signal. The transmission of the second video signal and the third video signal occurs based on their respective priorities. In some aspects, transmission or retransmission of the one or more groups having a lower priority may occur after transmission or retransmission of the one or more groups having a higher priority if resources are available.

At 1016, the second wireless device 1004 may transmit an ACK or NACK of reception of the video frame. The second wireless device may transmit the ACK or NACK to the first wireless device 1002. The first wireless device 1002 may receive the ACK or NACK of the reception of the video frame from the second wireless device 1004. Transmission of the video frame may be based on the prioritized transmission or a prioritized retransmission of the one or more groups having a higher priority over the one or more groups having a lower priority. In instances where the video frame comprises the interlaced signal comprising the first video signal, the second video signal, and the third video signal, for example, the second wireless device may determine to transmit the ACK or NACK for the first video signal based on the first video signal having the highest priority. Upon transmission of the ACK, to the first wireless device 1002, indicating successful reception of the first video signal, the second wireless device may determine to transmit the ACK or NACK for the second video signal, based on the second video signal having a higher priority than the third video signal. Upon transmission of the ACK, to the first wireless device 1002, indicating successful reception of the second video signal, the second wireless device may determine to transmit the ACK or NACK for the third video signal. In some aspects, the second wireless device may transmit a NACK to the first wireless device indicating that the first video signal was not properly received. In such instances, the first wireless device may retransmit the first video signal in response to reception of the NACK. The first video signal may be retransmitted in response to receipt of the NACK, until the second wireless device properly receives the first video signal and transmits an ACK. The remaining video signals (e.g., second video signal, third video signal) having a lower priority than the first video signal may then be transmitted to the second wireless device, such that the second wireless device may determine to transmit a corresponding ACK or NACK for the remaining video signals (e.g., second video signal, third video signal) based on their priority. The disclosure is not intended to be limited to the aspects presented herein. For example, the interlaced signal may comprise one or more video signals and is not intended to be limited to a first video signal, a second video signal, or a third video signal.

Figure 11:
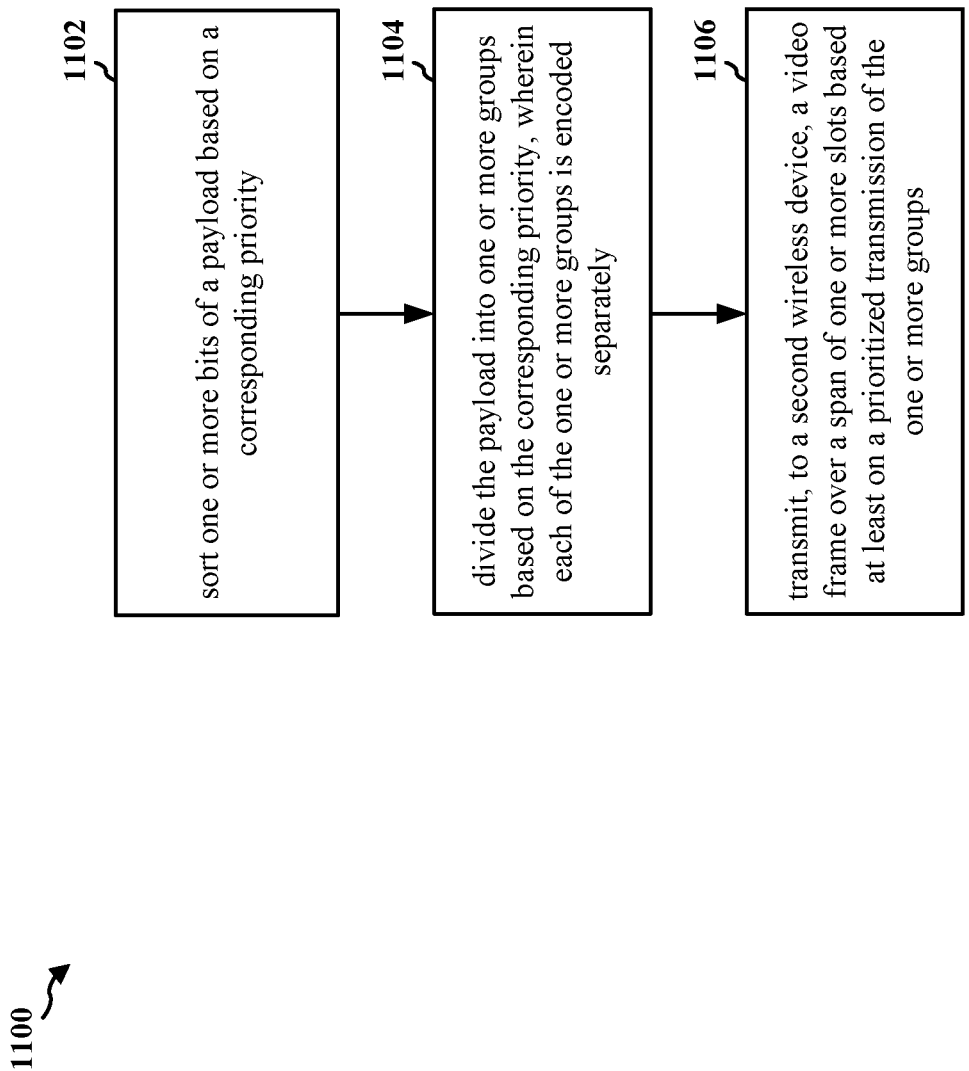
FIG. 11 is a flowchart of a method of wireless communication.

FIG. 11 is a flowchart 1100 of a method of wireless communication at a first wireless device. The method may be performed by a UE (e.g., the UE 104; the apparatus 1304). One or more of the illustrated operations may be omitted, transposed, or contemporaneous. The method may allow for latency to be fixed while the video quality may be varied.

At 1102, the first wireless device may sort one or more bits of a payload. For example, 1102 may be performed by payload component 198 of apparatus 1304. The first wireless device may sort the one or more bits of the payload based on a corresponding priority. In some aspects, the one or more bits of the payload may be sorted based on at least one of a bit position, a DCT coefficient index, a color component, one or more segments of interest in a frame, or one or more segments of motion in the frame.

At 1104, the first wireless device may divide the payload into one or more groups. For example, 1104 may be performed by payload component 198 of apparatus 1304. The first wireless device may divide the payload into the one or more groups based on the corresponding priority. Each of the one or more groups may be encoded separately. In some aspects, division of the payload into the one or more groups may be based on a most significant group to a least significant group. In some aspects, each of the one or more groups may comprise a corresponding modulation and coding scheme (MCS) per transmission occasion.

At 1106, the first wireless device may transmit a video frame over a span of one or more slots. For example, 1106 may be performed by payload component 198 of apparatus 1304. The first wireless device may transmit the video frame over the span of the one or more slots to a second wireless device. The first wireless device may transmit the video frame over the span of the one or more slots based at least on a prioritized transmission of the one or more groups. In some aspects, transmission of the video frame may be based on the prioritized transmission or a prioritized retransmission of the one or more groups having a higher priority over the one or more groups having a lower priority. In some aspects, transmission or retransmission of the one or more groups having a lower priority may occur after transmission or retransmission of the one or more groups having a higher priority if resources are available. In some aspects, the transmission of the video frame may be comprised of one or more interlaced signals of video transmissions, where each of the one or more interlaced signals may have different priorities. For example, the interlaced signal may comprise a first video signal having a first priority, a second video signal having a second priority, and a third video signal having a third priority, where the first priority has a highest priority, followed by the second priority, and the third priority having the lowest priority. In some instances, the first wireless device 1002 may transmit the video frame comprised of the interlaced signal having the first video signal, the second video signal, and the third video signal, where transmission of the first video signal, the second video signal, and the third video signal is occurs in order based on priority. The second wireless device 1004 receives the video frame comprised of the interlaced signal having the first video signal and may determine to transmit an ACK or NACK for the first video signal. The transmission of the second video signal and the third video signal occurs based on their respective priorities.

Figure 12:
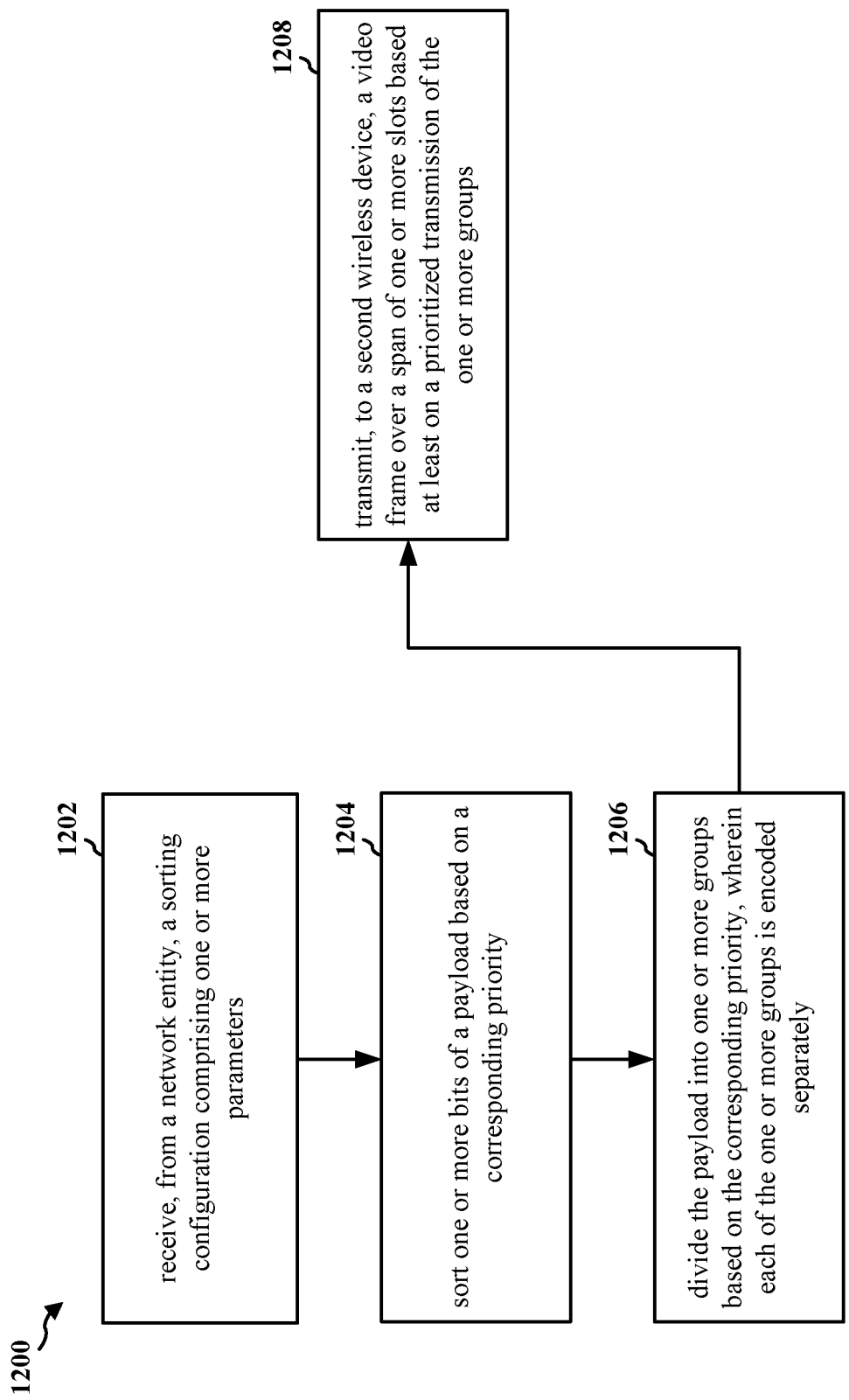
FIG. 12 is a flowchart of a method of wireless communication.

FIG. 12 is a flowchart 1200 of a method of wireless communication. The method may be performed by a UE (e.g., the UE 104; the apparatus 1304). One or more of the illustrated operations may be omitted, transposed, or contemporaneous. The method may The method may allow for latency to be fixed while the video quality may be varied.

At 1202, the first wireless device may receive, from a network entity, a sorting configuration comprising one or more parameters. For example, 1202 may be performed by payload component 198 of apparatus 1304. In some aspects, the one or more parameters may comprise at least one of payload sorting parameters, a number of priority groups, a number of slots per video frame, or a modulation and coding scheme per group or per retransmission. In some aspects, the sorting configuration may be received via at least one of RRC signaling, MAC-CE, or DCI. In some aspects, the sorting configuration may be received periodically or aperiodically.

At 1204, the first wireless device may sort one or more bits of a payload. For example, 1204 may be performed by payload component 198 of apparatus 1304. The first wireless device may sort the one or more bits of the payload based on a corresponding priority. In some aspects, the one or more bits of the payload may be sorted based on at least one of a bit position, a DCT coefficient index, a color component, one or more segments of interest in a frame, or one or more segments of motion in the frame. At 1206, the first wireless device may divide the payload into one or more groups. For example, 1206 may be performed by payload component 198 of apparatus 1304. The first wireless device may divide the payload into the one or more groups based on the corresponding priority. Each of the one or more groups may be encoded separately. In some aspects, division of the payload into the one or more groups may be based on a most significant group to a least significant group. In some aspects, each of the one or more groups may comprise a corresponding MCS per transmission occasion.

At 1208, the first wireless device may transmit a video frame over a span of one or more slots. For example, 1208 may be performed by payload component 198 of apparatus 1304. The first wireless device may transmit the video frame over the span of the one or more slots to a second wireless device. The first wireless device may transmit the video frame over the span of the one or more slots based at least on a prioritized transmission of the one or more groups. In some aspects, transmission of the video frame may be based on the prioritized transmission or a prioritized retransmission of the one or more groups having a higher priority over the one or more groups having a lower priority. In some aspects, transmission or retransmission of the one or more groups having a lower priority may occur after transmission or retransmission of the one or more groups having a higher priority if resources are available. In some aspects, the transmission of the video frame may be comprised of one or more interlaced signals of video transmissions, where each of the one or more interlaced signals may have different priorities. For example, the interlaced signal may comprise a first video signal having a first priority, a second video signal having a second priority, and a third video signal having a third priority, where the first priority has a highest priority, followed by the second priority, and the third priority having the lowest priority. In some instances, the first wireless device may transmit the video frame comprised of the interlaced signal having the first video signal, the second video signal, and the third video signal, where transmission of the first video signal, the second video signal, and the third video signal is occurs in order based on priority. The second wireless device receives the video frame comprised of the interlaced signal having the first video signal and may determine to transmit an ACK or NACK for the first video signal. The transmission of the second video signal and the third video signal occurs based on their respective priorities.

Figure 13:
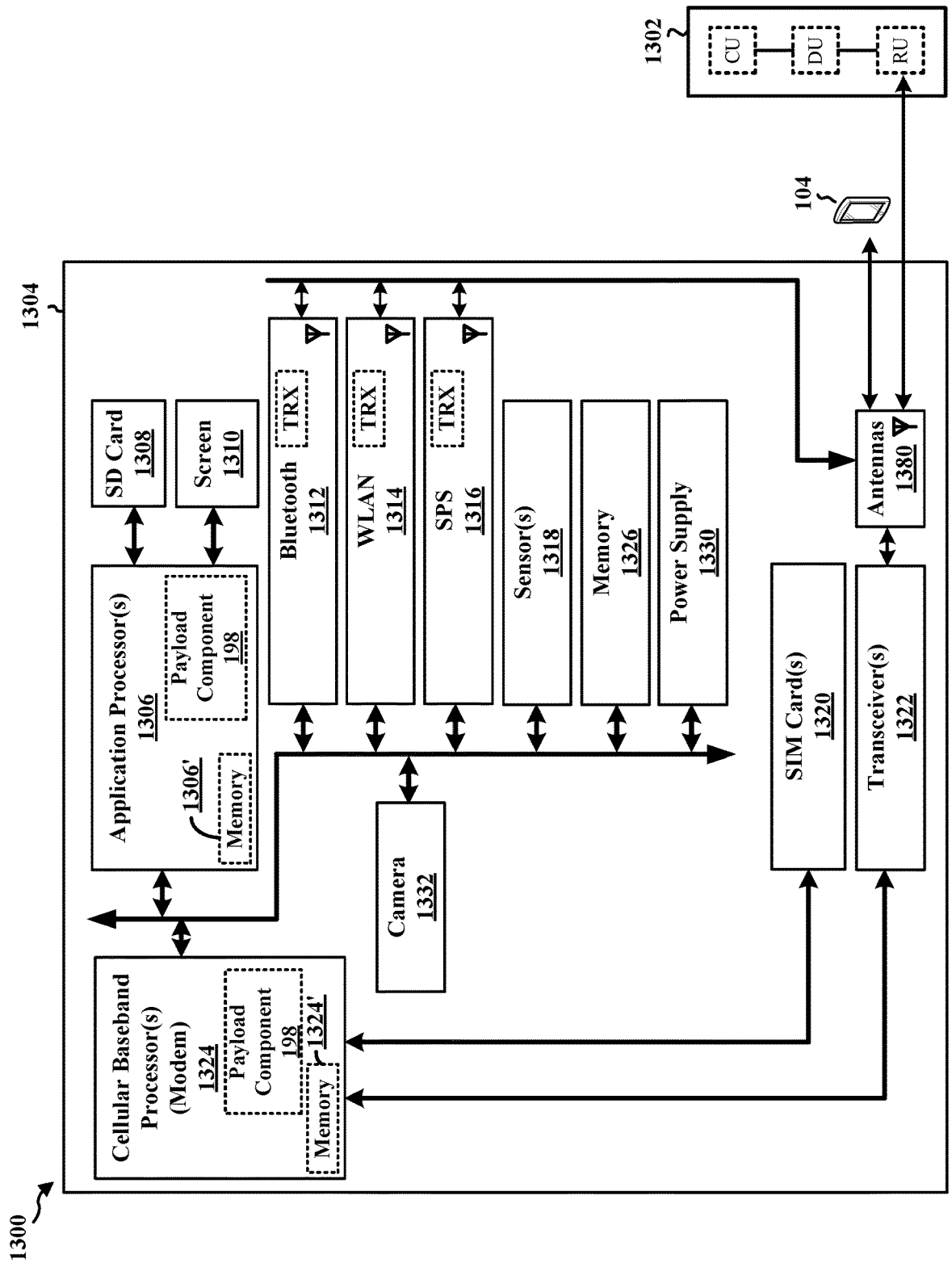
FIG. 13 is a diagram illustrating an example of a hardware implementation for an example apparatus and/or network entity.

FIG. 13 is a diagram 1300 illustrating an example of a hardware implementation for an apparatus 1304. The apparatus 1304 may be a UE, a component of a UE, or may implement UE functionality. In some aspects, the apparatus 1304 may include at least one cellular baseband processor 1324 (also referred to as a modem) coupled to one or more transceivers 1322 (e.g., cellular RF transceiver). The cellular baseband processor(s) 1324 may include at least one on-chip memory 1324'. In some aspects, the apparatus 1304 may further include one or more subscriber identity modules (SIM) cards 1320 and at least one application processor 1306 coupled to a secure digital (SD) card 1308 and a screen 1310. The application processor(s) 1306 may include on-chip memory 1306'. In some aspects, the apparatus 1304 may further include a Bluetooth module 1312, a WLAN module 1314, an SPS module 1316 (e.g., GNSS module), one or more sensor modules 1318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1326, a power supply 1330, and/or a camera 1332. The Bluetooth module 1312, the WLAN module 1314, and the SPS module 1316 may include an on-chip transceiver (TRX) (or in some cases, just a receiver (RX)). The Bluetooth module 1312, the WLAN module 1314, and the SPS module 1316 may include their own dedicated antennas and/or utilize the antennas 1380 for communication. The cellular baseband processor(s) 1324 communicates through the transceiver(s) 1322 via one or more antennas 1380 with the UE 104 and/or with an RU associated with a network entity 1302. The cellular baseband processor(s) 1324 and the application processor(s) 1306 may each include a computer-readable medium/memory 1324', 1306', respectively. The additional memory modules 1326 may also be considered a computer-readable medium/memory. Each computer-readable medium/memory 1324', 1306', 1326 may be non-transitory. The cellular baseband processor(s) 1324 and the application processor(s) 1306 are each responsible for general processing, including the execution of software stored on the computer-readable medium/memory. The software, when executed by the cellular baseband processor(s) 1324/application processor(s) 1306, causes the cellular baseband processor(s) 1324/application processor(s) 1306 to perform the various functions described supra. The cellular baseband processor(s) 1324 and the application processor(s) 1306 are configured to perform the various functions described supra based at least in part of the information stored in the memory. That is, the cellular baseband processor(s) 1324 and the application processor(s) 1306 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1324/application processor(s) 1306 when executing software. The cellular baseband processor(s) 1324/application processor(s) 1306 may be a component of the UE 350 and may include the at least one memory 360 and/or at least one of the TX processor 368, the RX processor 356, and the controller/processor 359. In one configuration, the apparatus 1304 may be at least one processor chip (modem and/or application) and include just the cellular baseband processor(s) 1324 and/or the application processor(s) 1306, and in another configuration, the apparatus 1304 may be the entire UE (e.g., see UE 350 of FIG. 3) and include the additional modules of the apparatus 1304.

As discussed supra, the component 198 may be configured to sort one or more bits of a payload based on a corresponding priority; divide the payload into one or more groups based on the corresponding priority, wherein each of the one or more groups is encoded separately; and transmit, to a second wireless device, a video frame over a span of one or more slots based at least on a prioritized transmission of the one or more groups. The component 198 may be within the cellular baseband processor(s) 1324, the application processor(s) 1306, or both the cellular baseband processor(s) 1324 and the application processor(s) 1306. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1304 may include a variety of components configured for various functions. In one configuration, the apparatus 1304, and in particular the cellular baseband processor(s) 1324 and/or the application processor(s) 1306, may include means for sorting one or more bits of a payload based on a corresponding priority. The apparatus includes means for dividing the payload into one or more groups based on the corresponding priority, wherein each of the one or more groups is encoded separately. The apparatus includes means for transmitting, to a second wireless device, a video frame over a span of one or more slots based at least on a prioritized transmission of the one or more groups. The means may be the component 198 of the apparatus 1304 configured to perform the functions recited by the means. As described supra, the apparatus 1304 may include the TX processor 368, the RX processor 356, and the controller/processor 359. As such, in one configuration, the means may be the TX processor 368, the RX processor 356, and/or the controller/processor 359 configured to perform the functions recited by the means.

Figure 14:
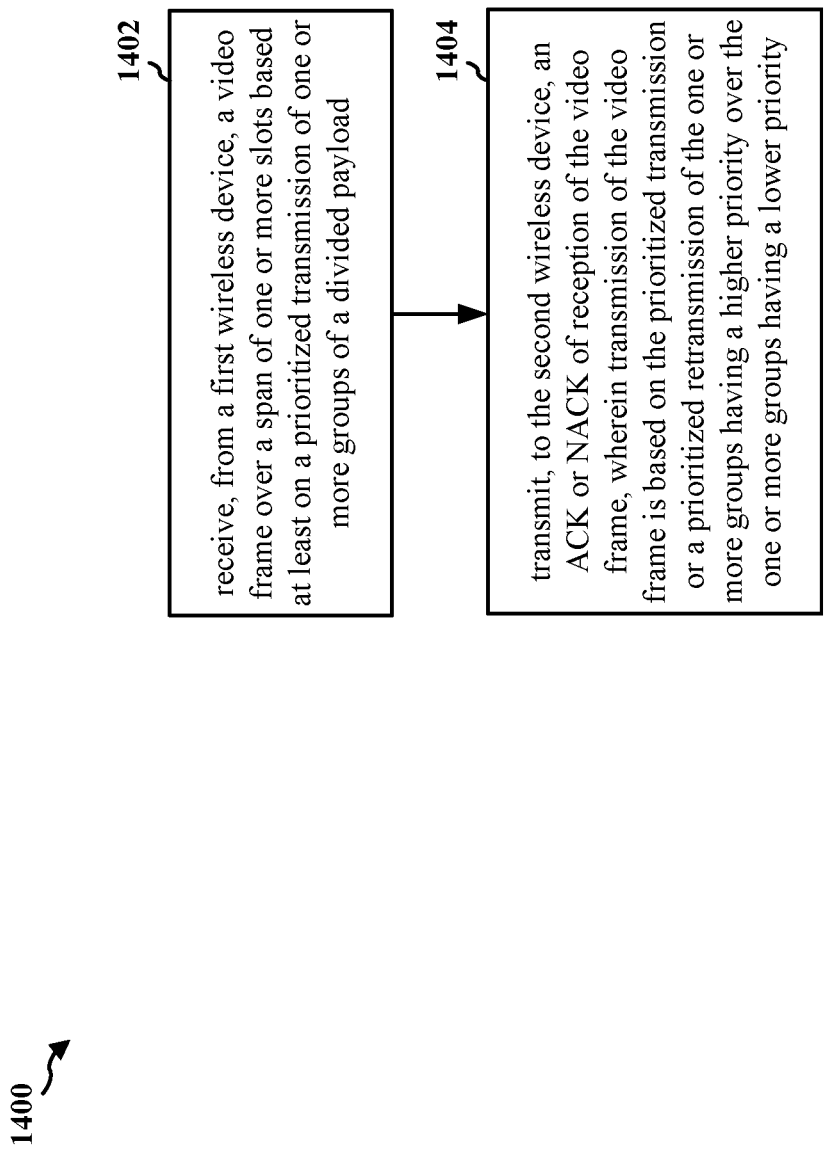
FIG. 14 is a flowchart of a method of wireless communication.

FIG. 14 is a flowchart 1400 of a method of wireless communication at a second wireless device. The method may be performed by a UE (e.g., the UE 104; the apparatus 1504) or may be performed by a network entity (e.g., the base station 102; the network entity 1502, 1602). One or more of the illustrated operations may be omitted, transposed, or contemporaneous. The method may The method may allow for latency to be fixed while the video quality may be varied.

At 1402, the second wireless device may receive a video frame over a span of one or more slots. For example, 1402 may be performed by payload component 199 of apparatus 1504 or network entity 1502, 1602. The second wireless device may receive the video frame over the span of the one or more slots from a first wireless device. The second wireless device may receive the video frame over the span of the one or more slots based at least on a prioritized transmission of one or more groups of a divided payload. In some aspects, one or more bits of the divided payload are sorted based on at least one of a bit position, a DCT coefficient index, a color component, one or more segments of interest in a frame, or one or more segments of motion in the frame. In some aspects, division of the divided payload into the one or more groups may be based on a most significant group to a least significant group. In some aspects, each of the one or more groups may comprise a corresponding MCS per transmission occasion. In some aspects, transmission or retransmission of the one or more groups having a lower priority may occur after transmission or retransmission of the one or more groups having a higher priority if resources are available.

At 1404, the second wireless device may transmit an ACK or NACK of reception of the video frame. For example, 1404 may be performed by payload component 199 of apparatus 1504 or network entity 1502, 1602. The second wireless device may transmit the ACK or NACK to the first wireless device. Transmission of the video frame may be based on the prioritized transmission or a prioritized retransmission of the one or more groups having a higher priority over the one or more groups having a lower priority. In instances where the video frame comprises the interlaced signal comprising the first video signal, the second video signal, and the third video signal, for example, the second wireless device may determine to transmit the ACK or NACK for the first video signal based on the first video signal having the highest priority. Upon transmission of the ACK, to the first wireless device, indicating successful reception of the first video signal, the second wireless device may determine to transmit the ACK or NACK for the second video signal, based on the second video signal having a higher priority than the third video signal. Upon transmission of the ACK, to the first wireless device, indicating successful reception of the second video signal, the second wireless device may determine to transmit the ACK or NACK for the third video signal. In some aspects, the second wireless device may transmit a NACK to the first wireless device indicating that the first video signal was not properly received. In such instances, the first wireless device may retransmit the first video signal in response to reception of the NACK. The first video signal may be retransmitted in response to receipt of the NACK, until the second wireless device properly receives the first video signal and transmits an ACK. The remaining video signals (e.g., second video signal, third video signal) having a lower priority than the first video signal may then be transmitted to the second wireless device, such that the second wireless device may determine to transmit a corresponding ACK or NACK for the remaining video signals (e.g., second video signal, third video signal) based on their priority.

Figure 15:
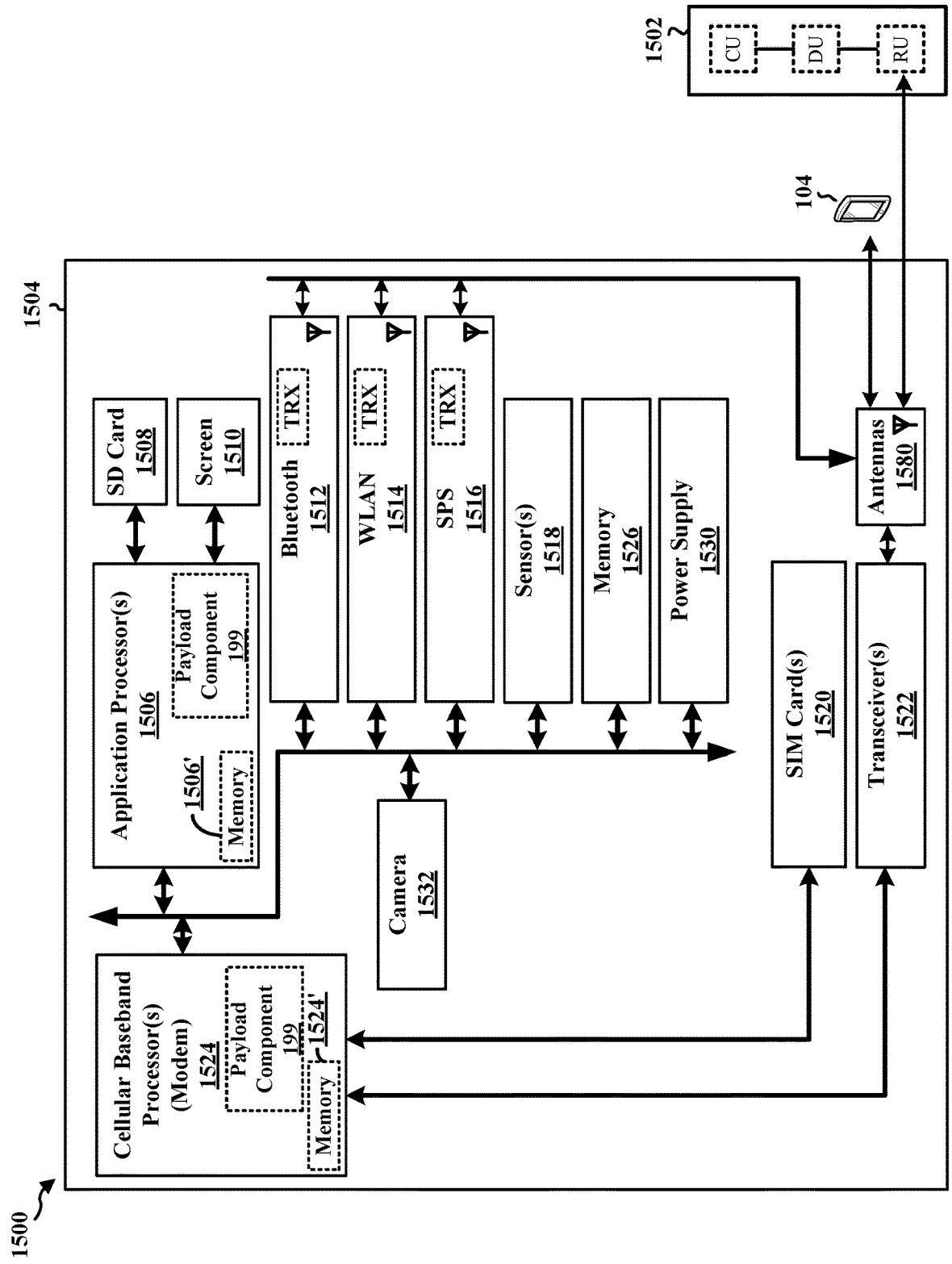
FIG. 15 is a diagram illustrating an example of a hardware implementation for an example apparatus and/or network entity.

FIG. 15 is a diagram 1500 illustrating an example of a hardware implementation for an apparatus 1504. The apparatus 1504 may be a UE, a component of a UE, or may implement UE functionality. In some aspects, the apparatus 1504 may include at least one cellular baseband processor 1524 (also referred to as a modem) coupled to one or more transceivers 1522 (e.g., cellular RF transceiver). The cellular baseband processor(s) 1524 may include at least one on-chip memory 1524'. In some aspects, the apparatus 1504 may further include one or more subscriber identity modules (SIM) cards 1520 and at least one application processor 1506 coupled to a secure digital (SD) card 1508 and a screen 1510. The application processor(s) 1506 may include on-chip memory 1506'. In some aspects, the apparatus 1504 may further include a Bluetooth module 1512, a WLAN module 1514, an SPS module 1516 (e.g., GNSS module), one or more sensor modules 1518 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 1526, a power supply 1530, and/or a camera 1532. The Bluetooth module 1512, the WLAN module 1514, and the SPS module 1516 may include an on-chip transceiver (TRX) (or in some cases, just a receiver (RX)). The Bluetooth module 1512, the WLAN module 1514, and the SPS module 1516 may include their own dedicated antennas and/or utilize the antennas 1580 for communication. The cellular baseband processor(s) 1524 communicates through the transceiver(s) 1522 via one or more antennas 1580 with the UE 104 and/or with an RU associated with a network entity 1502. The cellular baseband processor(s) 1524 and the application processor(s) 1506 may each include a computer-readable medium/memory 1524', 1506', respectively. The additional memory modules 1526 may also be considered a computer-readable medium/memory. Each computer-readable medium/memory 1524', 1506', 1526 may be non-transitory. The cellular baseband processor(s) 1524 and the application processor(s) 1506 are each responsible for general processing, including the execution of software stored on the computer-readable medium/memory. The software, when executed by the cellular baseband processor(s) 1524/application processor(s) 1506, causes the cellular baseband processor(s) 1524/application processor(s) 1506 to perform the various functions described supra. The cellular baseband processor(s) 1524 and the application processor(s) 1506 are configured to perform the various functions described supra based at least in part of the information stored in the memory. That is, the cellular baseband processor(s) 1524 and the application processor(s) 1506 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 1524/application processor(s) 1506 when executing software. The cellular baseband processor (s) 1524/application processor(s) 1506 may be a component of the UE 350 and may include the at least one memory 360 and/or at least one of the TX processor 368, the RX processor 356, and the controller/processor 359. In one configuration, the apparatus 1504 may be at least one processor chip (modem and/or application) and include just the cellular baseband processor(s) 1524 and/or the application processor(s) 1506, and in another configuration, the apparatus 1504 may be the entire UE (e.g., see UE 350 of FIG. 3) and include the additional modules of the apparatus 1504.

Figure 16:
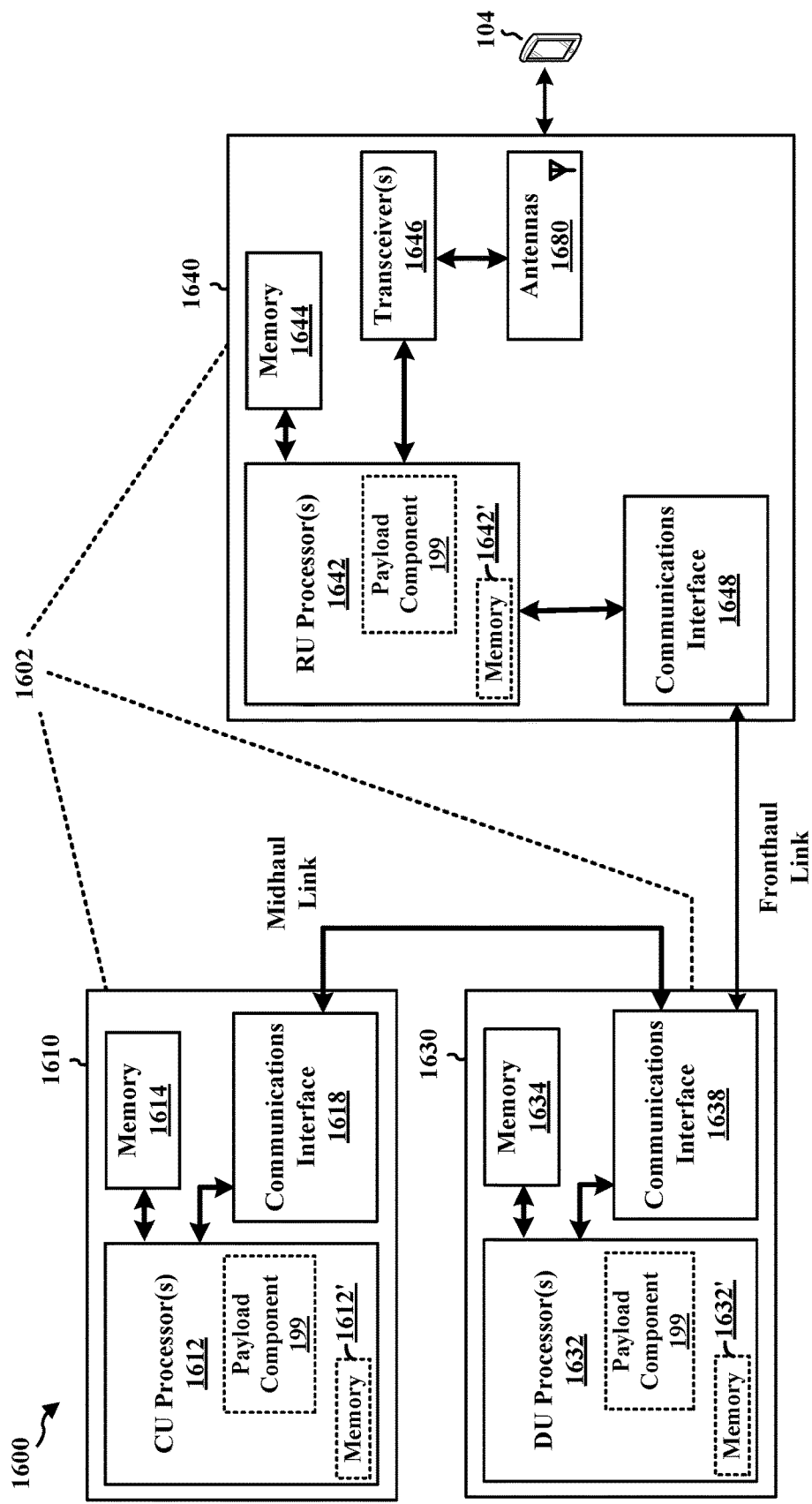
FIG. 16 is a diagram illustrating an example of a hardware implementation for an example network entity.

FIG. 16 is a diagram 1600 illustrating an example of a hardware implementation for a network entity 1602. The network entity 1602 may be a BS, a component of a BS, or may implement BS functionality. The network entity 1602 may include at least one of a CU 1610, a DU 1630, or an RU 1640. For example, depending on the layer functionality handled by the component 199, the network entity 1602 may include the CU 1610; both the CU 1610 and the DU 1630; each of the CU 1610, the DU 1630, and the RU 1640; the DU 1630; both the DU 1630 and the RU 1640; or the RU 1640. The CU 1610 may include at least one CU processor 1612. The CU processor(s) 1612 may include on-chip memory 1612'. In some aspects, the CU 1610 may further include additional memory modules 1614 and a communications interface 1618. The CU 1610 communicates with the DU 1630 through a midhaul link, such as an F1 interface. The DU 1630 may include at least one DU processor 1632. The DU processor(s) 1632 may include on-chip memory 1632'. In some aspects, the DU 1630 may further include additional memory modules 1634 and a communications interface 1638. The DU 1630 communicates with the RU 1640 through a fronthaul link. The RU 1640 may include at least one RU processor 1642. The RU processor(s) 1642 may include on-chip memory 1642'. In some aspects, the RU 1640 may further include additional memory modules 1644, one or more transceivers 1646, antennas 1680, and a communications interface 1648. The RU 1640 communicates with the UE 104. The on-chip memory 1612', 1632', 1642' and the additional memory modules 1614, 1634, 1644 may each be considered a computer-readable medium/memory. Each computer-readable medium/memory may be non-transitory. Each of the processors 1612, 1632, 1642 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive, from a first wireless device, a video frame over a span of one or more slots based at least on a prioritized transmission of one or more groups of a divided payload; and transmit, to the second wireless device, an ACK or NACK of reception of the video frame, wherein transmission of the video frame is based on the prioritized transmission or a prioritized retransmission of the one or more groups having a higher priority over the one or more groups having a lower priority. In some aspects, the component 199 may be within the cellular baseband processor(s) 1524, the application processor(s) 1506, or both the cellular baseband processor(s) 1524 and the application processor(s) 1506. In some aspects, the component 199 may be within one or more processors of one or more of the CU 1610, DU 1630, and the RU 1640. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 1504 may include a variety of components configured for various functions. In one configuration, the apparatus 1504, and in particular the cellular baseband processor(s) 1524 and/or the application processor(s) 1506, may include means for receiving, from a first wireless device, a video frame over a span of one or more slots based at least on a prioritized transmission of one or more groups of a divided payload. The apparatus includes means for transmitting, to the second wireless device, an ACK or NACK of reception of the video frame. Transmission of the video frame is based on the prioritized transmission or a prioritized retransmission of the one or more groups having a higher priority over the one or more groups having a lower priority. The means may be the component 199 of the apparatus 1504 configured to perform the functions recited by the means. As described supra, the apparatus 1504 may include the TX processor 368, the RX processor 356, and the controller/processor 359. As such, in one configuration, the means may be the TX processor 368, the RX processor 356, and/or the controller/processor 359 configured to perform the functions recited by the means.

The network entity 1602 may include a variety of components configured for various functions. In one configuration, the network entity 1602 may include means for receiving, from a first wireless device, a video frame over a span of one or more slots based at least on a prioritized transmission of one or more groups of a divided payload. The network entity includes means for transmitting, to the second wireless device, an ACK or NACK of reception of the video frame. Transmission of the video frame is based on the prioritized transmission or a prioritized retransmission of the one or more groups having a higher priority over the one or more groups having a lower priority. The means may be the component 199 of the network entity 1602 configured to perform the functions recited by the means. As described supra, the network entity 1602 may include the TX processor 316, the RX processor 370, and the controller/processor 375. As such, in one configuration, the means may be the TX processor 316, the RX processor 370, and/or the controller/processor 375 configured to perform the functions recited by the means.

Figure 17:
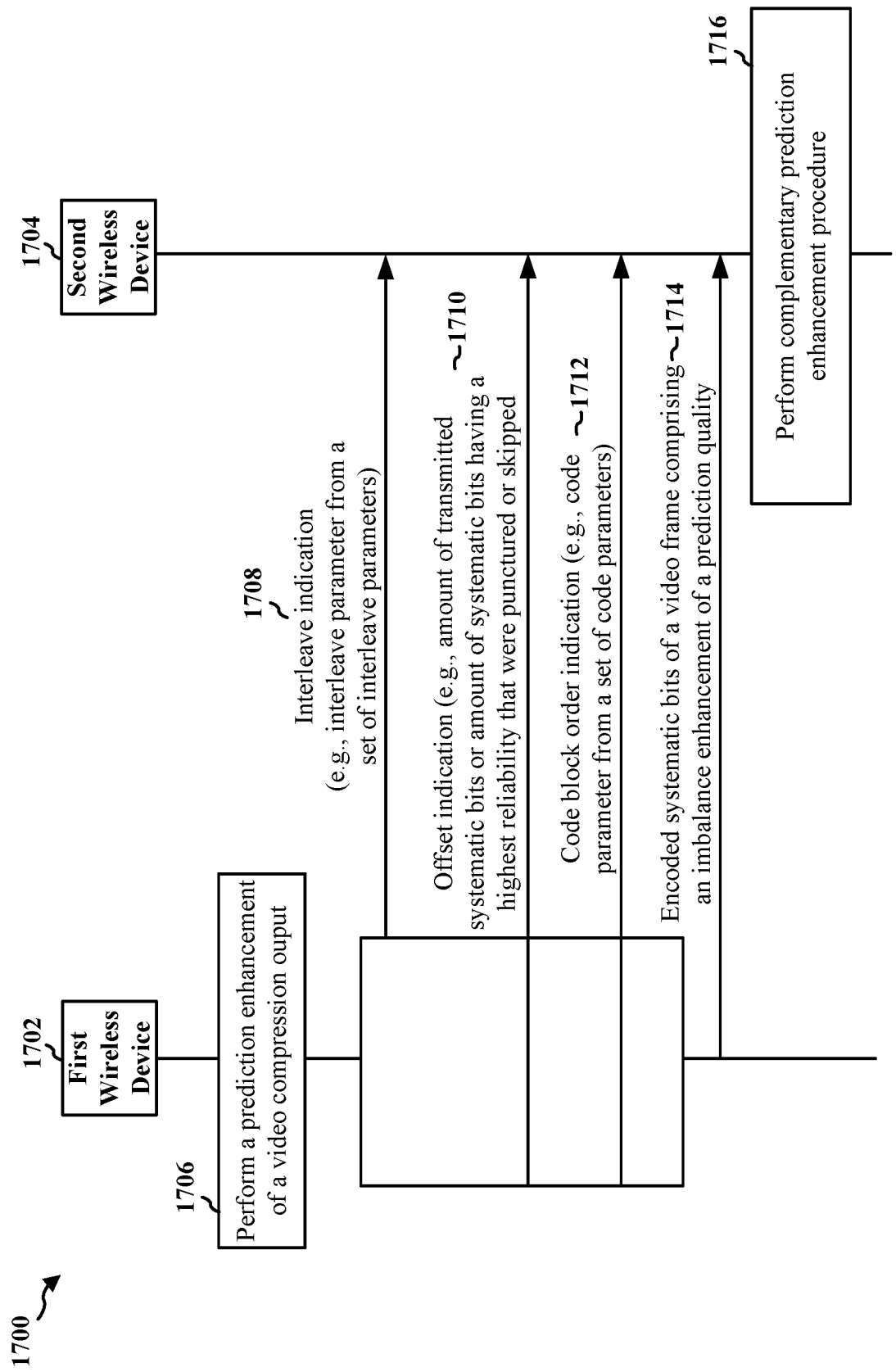
FIG. 17 is a call flow diagram of signaling between a first wireless device, a second wireless device, and a network entity.

FIG. 17 is a call flow diagram 1700 of signaling between a first wireless device 1702 and a second wireless device 1704. The first wireless device 1702 may be configured to communicate with the second wireless device 1704. For example, in the context of FIG. 1, the second wireless device 1704 may correspond to base station 102 or the UE 104, and the first wireless device 1702 may correspond to at least UE 104. In another example, in the context of FIG. 3, the second wireless device 1704 may correspond to base station 310 and the first wireless device 1702 may correspond to UE 350. In some aspects, the first wireless device 1702 may comprise an XR device (e.g., goggles, headset) or a UE, where the second wireless device may comprise a UE or a base station, such that the XR device (e.g., first wireless device) may communicate with the UE/base station (e.g., second wireless device).

At 1706, the first wireless device 1702 may perform a prediction enhancement of a video compression output. The prediction enhancement may be based at least on an interleave operation or a code block order operation. In some aspects, the interleave operation of the prediction enhancement may distribute systematic bits over one or more code blocks. Each of the one or more code blocks may comprise a similar or different distribution of prediction qualities. In some aspects, the interleave operation may comprise one or more video streams from one or more components. In some aspects, the interleave operation may be applied to at least a portion of a video frame of the video compression output. In some aspects, the code block order operation of the prediction enhancement may order systematic bits based on a reliability of prediction quality. The systematic bits may be ordered based on the systematic bits having a highest reliability for prediction to the systematic bits having a lowest reliability for prediction. In some aspects, the code block order operation may comprise a rate matching offset to determine an amount of the systematic bits having the lowest reliability for prediction for transmission.

In some aspects, for example at 1708, the first wireless device 1702 may transmit an interleave indication to the second wireless device 1704. The second wireless device 1704 may receive the interleave indication from the first wireless device 1702. The interleave indication may indicate an interleave parameter from the set of interleave parameters utilized in the interleave operation. In some aspects, the interleave operation may be based on the interleave parameter from a set of interleave parameters. In some aspects, the interleave parameter may be based on at least one of interleaved video frame regions, an interleave order, or an interleave pattern.

In some aspects, for example at 1710, the first wireless device 1702 may transmit an offset indication to the second wireless device 1704. The second wireless device 1704 may receive the offset indication from the first wireless device 1702. The offset indication may indicate at least one of the amount of the systematic bits that were transmitted or an amount of the systematic bits having a highest reliability that were punctured or skipped.

In some aspects, for example at 1712, the first wireless device 1702 may transmit a code block order indication to the second wireless device 1704. The second wireless device 1704 may receive the code block indication from the first wireless device 1702. The code block order indication may indicate a code parameter from a set of code parameters utilized in the code block order operation. In some aspects, the code block order operation may be based on the code parameter to equalize protection of the systematic bits based on a prediction quality distribution. In some aspects, the code parameter may be a LDPC graph selection. In some aspects, the code parameter may be based on at least one of an order of the systematic bits based on a reliability of prediction quality, a codebook of different ordering, or an ordering for at least a part of a frame region of the video frame. In some aspects, the code parameter may be based on a reliability of the systematic bits, a sorted reliability of the systematic bits from a highest reliability to a lowest reliability, or an ordering of the systematic bits.

At 1714, the first wireless device 1702 may transmit encoded systematic bits of a video frame the second wireless device 1704. The second wireless device 1704 may receive the encoded systematic bits of the video frame from the first wireless device 1702. The first wireless device may transmit the encoded systematic bits of the video frame comprising an imbalance enhancement of a prediction quality based on the prediction enhancement.

At 1716, the second wireless device 1704 may perform a complementary prediction enhancement procedure. The complementary prediction enhancement procedure may comprise at least one of a de-interleave operation or a code block de-order operation on decoded systematic bits of the video frame to predict content of one or more subsequent video frames based on a previously received video frame.

Figure 18:
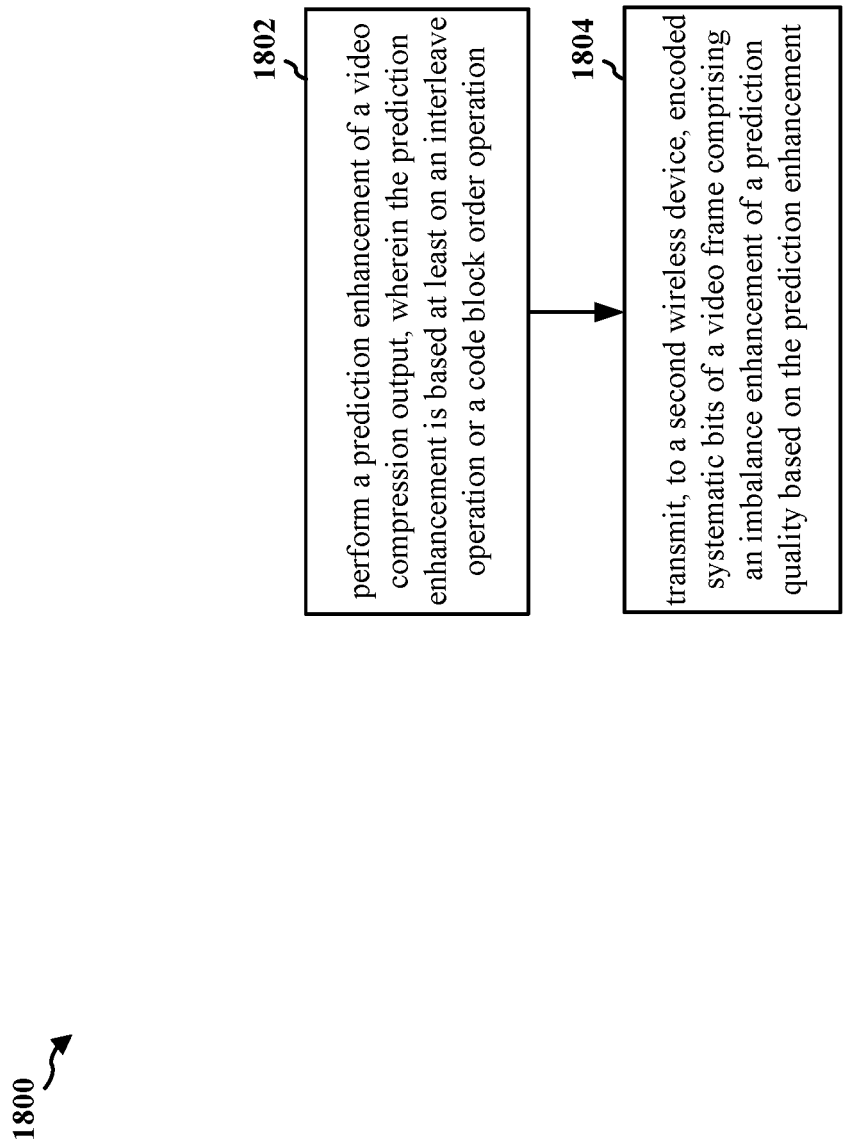
FIG. 18 is a flowchart of a method of wireless communication.

FIG. 18 is a flowchart 1800 of a method of wireless communication. The method may be performed by a UE (e.g., the UE 104; the apparatus 2004). One or more of the illustrated operations may be omitted, transposed, or contemporaneous. The method may allow for enhancements for imbalances of the prediction quality in DVC.

At 1802, the first wireless device may perform a prediction enhancement of a video compression output. For example, 1802 may be performed by payload component 198 of apparatus 2004. The prediction enhancement may be based at least on an interleave operation or a code block order operation. In some aspects, the interleave operation of the prediction enhancement may distribute systematic bits over one or more code blocks. Each of the one or more code blocks may comprise a similar or different distribution of prediction qualities. In some aspects, the interleave operation may comprise one or more video streams from one or more components. In some aspects, the interleave operation may be applied to at least a portion of a video frame of the video compression output. In some aspects, the code block order operation of the prediction enhancement may order systematic bits based on a reliability of prediction quality. The systematic bits may be ordered based on the systematic bits having a highest reliability for prediction to the systematic bits having a lowest reliability for prediction. In some aspects, the code block order operation may comprise a rate matching offset to determine an amount of the systematic bits having the lowest reliability for prediction for transmission.

At 1804, the first wireless device may transmit encoded systematic bits of a video frame. For example, 1804 may be performed by payload component 198 of apparatus 2004. The first wireless device may transmit the encoded systematic bits of the video frame to the second wireless device. The first wireless device may transmit the encoded systematic bits of the video frame comprising an imbalance enhancement of a prediction quality based on the prediction enhancement.

Figure 19:
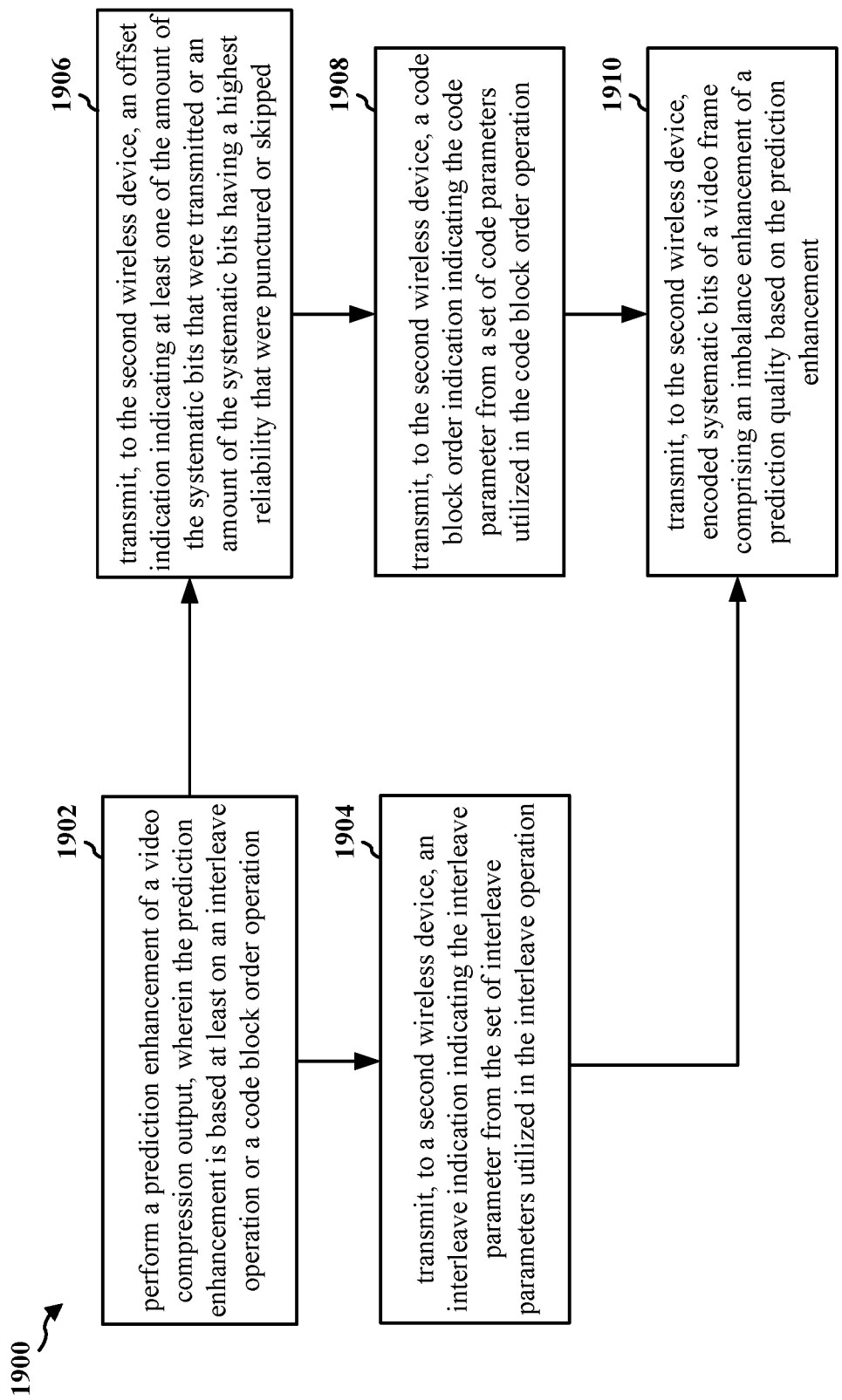
FIG. 19 is a flowchart of a method of wireless communication.

FIG. 19 is a flowchart 1900 of a method of wireless communication at a first wireless device. The method may be performed by a UE (e.g., the UE 104; the apparatus 2004). One or more of the illustrated operations may be omitted, transposed, or contemporaneous. The method may allow for enhancements for imbalances of the prediction quality in DVC.

At 1902, the first wireless device may perform a prediction enhancement of a video compression output. For example, 1902 may be performed by payload component 198 of apparatus 2004. The prediction enhancement may be based at least on an interleave operation or a code block order operation. In some aspects, the interleave operation of the prediction enhancement may distribute systematic bits over one or more code blocks. Each of the one or more code blocks may comprise a similar or different distribution of prediction qualities. In some aspects, the interleave operation may comprise one or more video streams from one or more components. In some aspects, the interleave operation may be applied to at least a portion of a video frame of the video compression output. In some aspects, the code block order operation of the prediction enhancement may order systematic bits based on a reliability of prediction quality. The systematic bits may be ordered based on the systematic bits having a highest reliability for prediction to the systematic bits having a lowest reliability for prediction. In some aspects, the code block order operation may comprise a rate matching offset to determine an amount of the systematic bits having the lowest reliability for prediction for transmission.

At 1904, the first wireless device may transmit an interleave indication. For example, 1904 may be performed by payload component 198 of apparatus 2004. The first wireless device may transmit the interleave indication to the second wireless device. The interleave indication may indicate an interleave parameter from the set of interleave parameters utilized in the interleave operation. In some aspects, the interleave operation may be based on the interleave parameter from a set of interleave parameters. In some aspects, the interleave parameter may be based on at least one of interleaved video frame regions, an interleave order, or an interleave pattern.

At 1906, the first wireless device may transmit an offset indication. For example, 1906 may be performed by payload component 198 of apparatus 2004. The first wireless device may transmit the offset indication to the second wireless device. The offset indication may indicate at least one of the amount of the systematic bits that were transmitted or an amount of the systematic bits having a highest reliability that were punctured or skipped.

At 1908, the first wireless device may transmit a code block order indication. For example, 1908 may be performed by payload component 198 of apparatus 2004. The first wireless device may transmit the code block order indication to the second wireless device. The code block order indication may indicate a code parameter from a set of code parameters utilized in the code block order operation. In some aspects, the code block order operation may be based on the code parameter to equalize protection of the systematic bits based on a prediction quality distribution. In some aspects, the code parameter may be a LDPC graph selection. In some aspects, the code parameter may be based on at least one of an order of the systematic bits based on a reliability of prediction quality, a codebook of different ordering, or an ordering for at least a part of a frame region of the video frame. In some aspects, the code parameter may be based on a reliability of the systematic bits, a sorted reliability of the systematic bits from a highest reliability to a lowest reliability, or an ordering of the systematic bits.

At 1910, the first wireless device may transmit encoded systematic bits of a video frame. For example, 1910 may be performed by payload component 198 of apparatus 2004. The first wireless device may transmit the encoded systematic bits of the video frame to the second wireless device. The first wireless device may transmit the encoded systematic bits of the video frame comprising an imbalance enhancement of a prediction quality based on the prediction enhancement.

Figure 20:
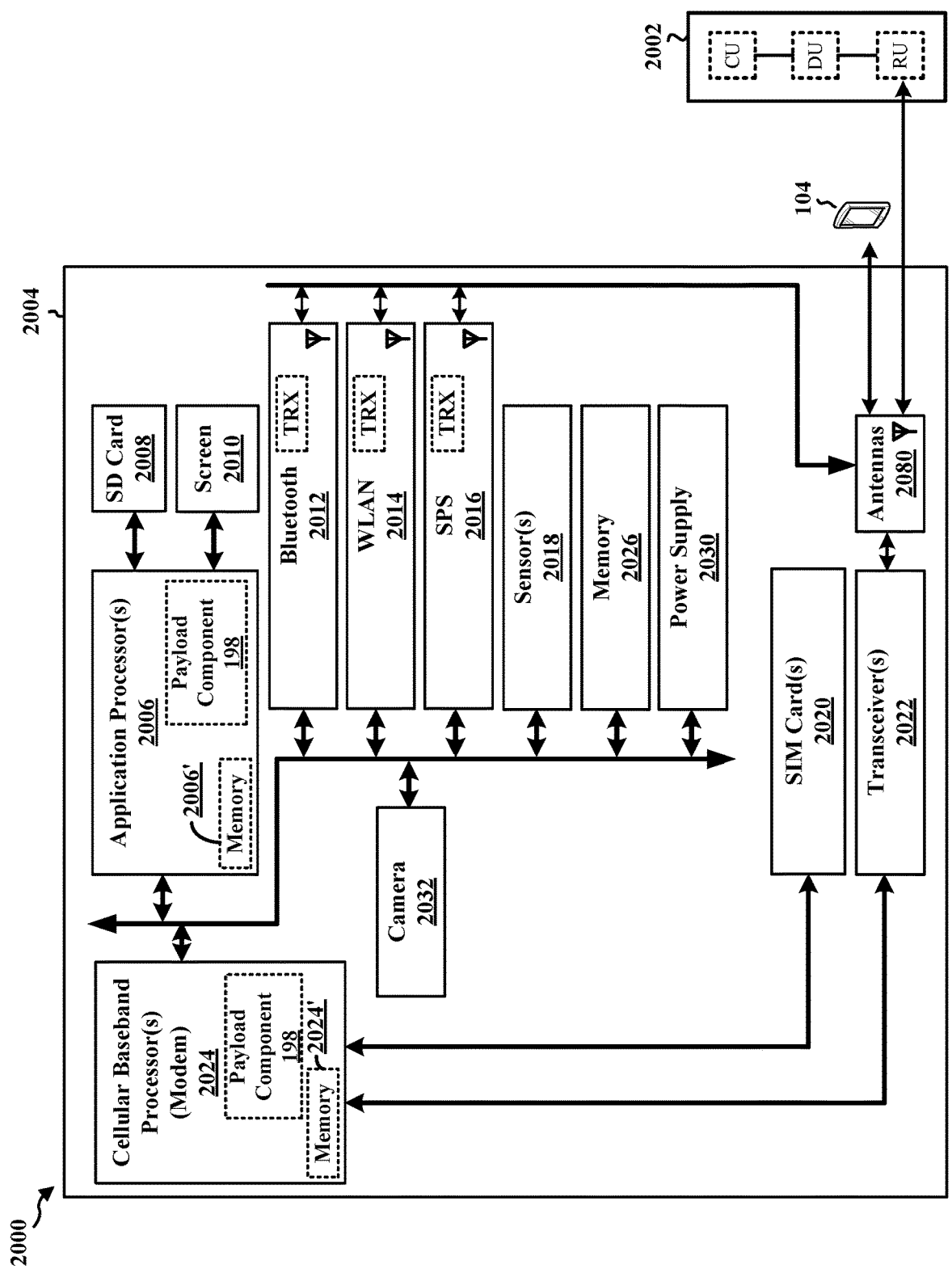
FIG. 20 is a diagram illustrating an example of a hardware implementation for an example apparatus and/or network entity.

FIG. 20 is a diagram 2000 illustrating an example of a hardware implementation for an apparatus 2004. The apparatus 2004 may be a UE, a component of a UE, or may implement UE functionality. In some aspects, the apparatus 2004 may include at least one cellular baseband processor 2024 (also referred to as a modem) coupled to one or more transceivers 2022 (e.g., cellular RF transceiver). The cellular baseband processor(s) 2024 may include at least one on-chip memory 2024'. In some aspects, the apparatus 2004 may further include one or more subscriber identity modules (SIM) cards 2020 and at least one application processor 2006 coupled to a secure digital (SD) card 2008 and a screen 2010. The application processor(s) 2006 may include on-chip memory 2006'. In some aspects, the apparatus 2004 may further include a Bluetooth module 2012, a WLAN module 2014, an SPS module 2016 (e.g., GNSS module), one or more sensor modules 2018 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2026, a power supply 2030, and/or a camera 2032. The Bluetooth module 2012, the WLAN module 2014, and the SPS module 2016 may include an on-chip transceiver (TRX) (or in some cases, just a receiver (RX)). The Bluetooth module 2012, the WLAN module 2014, and the SPS module 2016 may include their own dedicated antennas and/or utilize the antennas 2080 for communication. The cellular baseband processor(s) 2024 communicates through the transceiver(s) 2022 via one or more antennas 2080 with the UE 104 and/or with an RU associated with a network entity 2002. The cellular baseband processor(s) 2024 and the application processor(s) 2006 may each include a computer-readable medium/memory 2024', 2006', respectively. The additional memory modules 2026 may also be considered a computer-readable medium/memory. Each computer-readable medium/memory 2024', 2006', 2026 may be non-transitory. The cellular baseband processor(s) 2024 and the application processor(s) 2006 are each responsible for general processing, including the execution of software stored on the computer-readable medium/memory. The software, when executed by the cellular baseband processor(s) 2024/application processor(s) 2006, causes the cellular baseband processor(s) 2024/application processor(s) 2006 to perform the various functions described supra. The cellular baseband processor(s) 2024 and the application processor(s) 2006 are configured to perform the various functions described supra based at least in part of the information stored in the memory. That is, the cellular baseband processor(s) 2024 and the application processor(s) 2006 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 2024/application processor(s) 2006 when executing software. The cellular baseband processor(s) 2024/application processor(s) 2006 may be a component of the UE 350 and may include the at least one memory 360 and/or at least one of the TX processor 368, the RX processor 356, and the controller/processor 359. In one configuration, the apparatus 2004 may be at least one processor chip (modem and/or application) and include just the cellular baseband processor(s) 2024 and/or the application processor(s) 2006, and in another configuration, the apparatus 2004 may be the entire UE (e.g., see UE 350 of FIG. 3) and include the additional modules of the apparatus 2004.

As discussed supra, the component 198 may be configured to perform a prediction enhancement of a video compression output, wherein the prediction enhancement is based at least on an interleave operation or a code block order operation; and transmit, to a second wireless device, encoded systematic bits of a video frame comprising an imbalance enhancement of a prediction quality based on the prediction enhancement. The component 198 may be within the cellular baseband processor(s) 2024, the application processor(s) 2006, or both the cellular baseband processor(s) 2024 and the application processor(s) 2006. The component 198 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 2004 may include a variety of components configured for various functions. In one configuration, the apparatus 2004, and in particular the cellular baseband processor(s) 2024 and/or the application processor(s) 2006, may include means for performing a prediction enhancement of a video compression output. The prediction enhancement is based at least on an interleave operation or a code block order operation. The apparatus includes means for transmitting, to a second wireless device, encoded systematic bits of a video frame comprising an imbalance enhancement of a prediction quality based on the prediction enhancement. The apparatus further includes means for transmitting, to the second wireless device, an interleave indication indicating the interleave parameter from the set of interleave parameters utilized in the interleave operation. The apparatus further includes means for transmitting, to the second wireless device, an offset indication indicating at least one of the amount of the systematic bits that were transmitted or an amount of the systematic bits having a highest reliability that were punctured or skipped. The apparatus further includes means for transmitting, to the second wireless device, a code block order indication indicating the code parameter from a set of code parameters utilized in the code block order operation. The means may be the component 198 of the apparatus 2004 configured to perform the functions recited by the means. As described supra, the apparatus 2004 may include the TX processor 368, the RX processor 356, and the controller/processor 359. As such, in one configuration, the means may be the TX processor 368, the RX processor 356, and/or the controller/processor 359 configured to perform the functions recited by the means.

Figure 21:
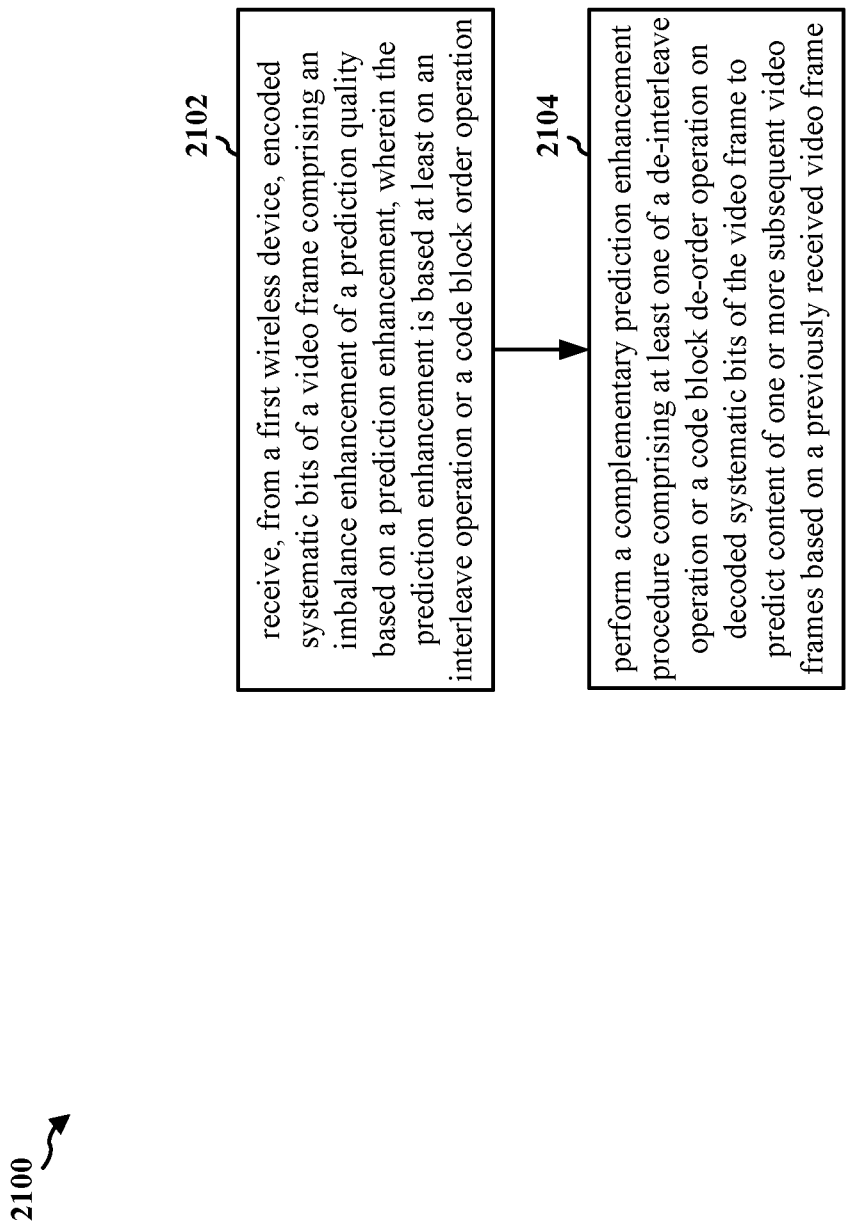
FIG. 21 is a flowchart of a method of wireless communication.

FIG. 21 is a flowchart 2100 of a method of wireless communication at a second wireless device. The method may be performed by a UE (e.g., the UE 104; the apparatus 2304) or may be performed by a network entity (e.g., the base station 102; the network entity 2302, 2402). One or more of the illustrated operations may be omitted, transposed, or contemporaneous. The method may allow for enhancements for imbalances of the prediction quality in DVC.

At 2102, the second wireless device may receive encoded systematic bits of a video frame. For example, 2102 may be performed by payload component 199 of apparatus 2304 or network entity 2302, 2402. The second wireless device may receive the encoded systematic bits of the video frame from a first wireless device. The second wireless device may receive the encoded systematic bits of the video frame comprising an imbalance enhancement of a prediction quality based on a prediction enhancement. The prediction enhancement may be based at least on an interleave operation or a code block order operation. In some aspects, the interleave operation of the prediction enhancement may distribute systematic bits over one or more code blocks. Each of the one or more code blocks comprise a similar distribution of prediction qualities. The interleave operation may comprise one or more video streams from one or more components. In some aspects, the code block order operation of the prediction enhancement may order systematic bits based on a reliability of prediction quality. The systematic bits may be ordered based on the systematic bits having a highest reliability for prediction to the systematic bits having a lowest reliability for prediction. In some aspects, the code block order operation may comprise a rate matching offset to determine an amount of the systematic bits having the lowest reliability for prediction for transmission.

At 2104, the second wireless device may perform a complementary prediction enhancement procedure. For example, 2104 may be performed by payload component 199 of apparatus 2304 or network entity 2302, 2402. The complementary prediction enhancement procedure may comprise at least one of a de-interleave operation or a code block de-order operation on decoded systematic bits of the video frame to predict content of one or more subsequent video frames based on a previously received video frame.

Figure 22:
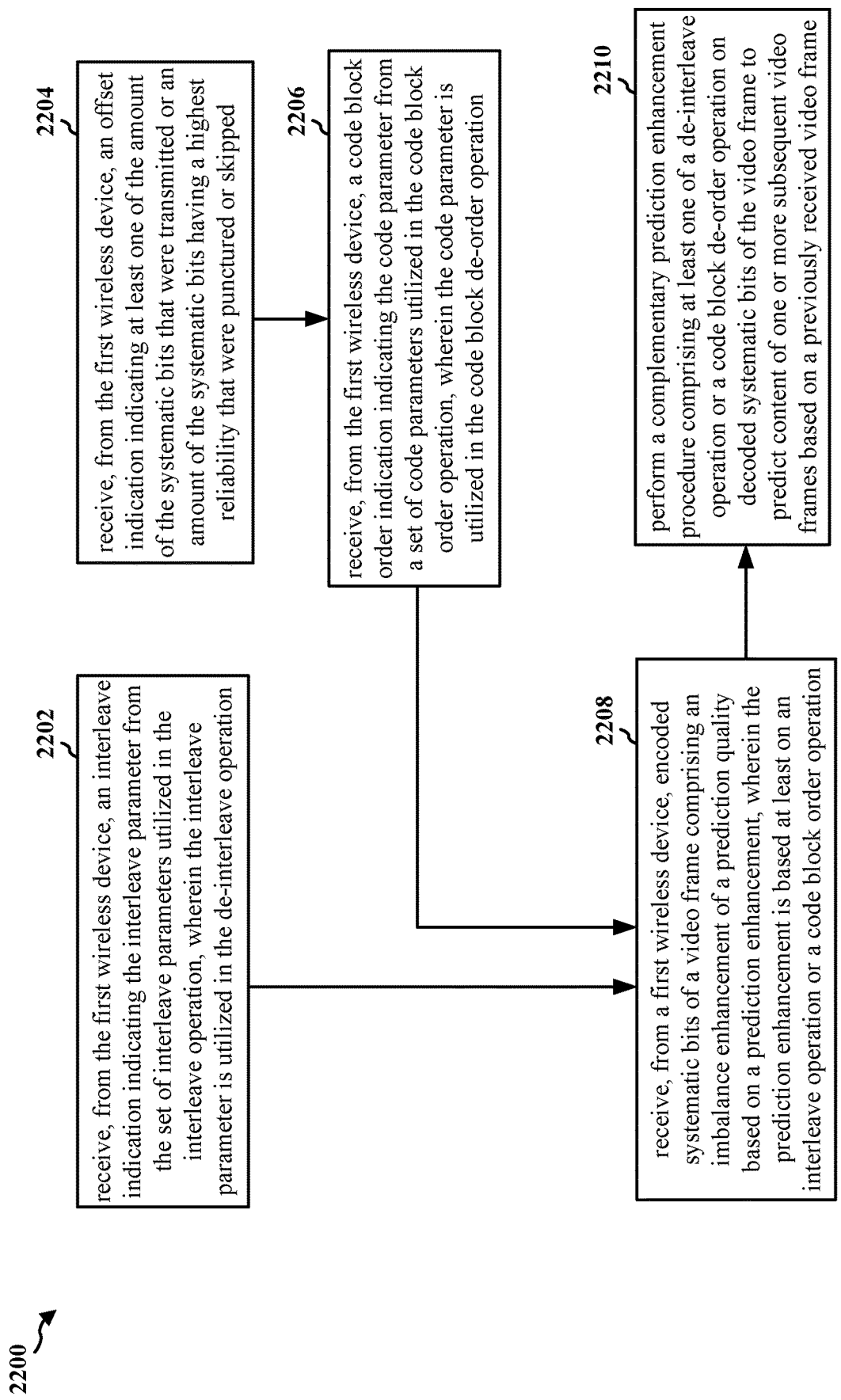
FIG. 22 is a flowchart of a method of wireless communication.

FIG. 22 is a flowchart 2200 of a method of wireless communication at a second wireless device. The method may be performed by a UE (e.g., the UE 104; the apparatus 2304) or may be performed by a network entity (e.g., the base station 102; the network entity 2302, 2402). One or more of the illustrated operations may be omitted, transposed, or contemporaneous. The method may allow for enhancements for imbalances of the prediction quality in DVC.

At 2202, the second wireless device may receive an interleave indication. For example, 2202 may be performed by payload component 199 of apparatus 2304 of network entity 2302, 2402. The second wireless device may receive the interleave indication from a first wireless device. The interleave indication may indicate an interleave parameter from a set of interleave parameters utilized in an interleave operation. The interleave parameter may be utilized in a de-interleave operation. The interleave operation may be based on the interleave parameter from a set of interleave parameters. In some aspects, the interleave parameter may be based on at least one of interleaved video frame regions, an interleave order, or an interleave pattern.

At 2204, the second wireless device may receive an offset indication. For example, 2204 may be performed by payload component 199 of apparatus 2304 or network entity 2302, 2402. The second wireless device may receive the offset indication from the first wireless device. The offset indication may indicate at least one of an amount of systematic bits that were transmitted or an amount of the systematic bits having a highest reliability that were punctured or skipped.

At 2206, the second wireless device may receive a code block order indication. For example, 2206 may be performed by payload component 199 of apparatus 2304 or network entity 2302, 2402. The second wireless device may receive the code block order indication from the first wireless device. The code block order indication may indicate a code parameter from a set of code parameters utilized in a code block order operation. The code parameter may be utilized in a code block de-order operation. In some aspects, the code block order operation may be based on the code parameter to equalize protection of the systematic bits based on a prediction quality distribution. In some aspects, the code parameter may be based on at least one of an order of the systematic bits based on a reliability of prediction quality, a codebook of different ordering, or an ordering for at least a part of a frame region of the video frame. In some aspects, the code parameter may be based on a reliability of the systematic bits, a sorted reliability of the systematic bits from a highest reliability to a lowest reliability, or an ordering of the systematic bits.

At 2208, the second wireless device may receive encoded systematic bits of a video frame. For example, 2202 may be performed by payload component 199 of apparatus 2304 or network entity 2302, 2402. The second wireless device may receive the encoded systematic bits of the video frame from the first wireless device. The second wireless device may receive the encoded systematic bits of the video frame comprising an imbalance enhancement of a prediction quality based on a prediction enhancement. The prediction enhancement may be based at least on an interleave operation or a code block order operation. In some aspects, the interleave operation of the prediction enhancement may distribute systematic bits over one or more code blocks. Each of the one or more code blocks comprise a similar distribution of prediction qualities. The interleave operation may comprise one or more video streams from one or more components. In some aspects, the code block order operation of the prediction enhancement may order systematic bits based on a reliability of prediction quality. The systematic bits may be ordered based on the systematic bits having a highest reliability for prediction to the systematic bits having a lowest reliability for prediction. In some aspects, the code block order operation may comprise a rate matching offset to determine an amount of the systematic bits having the lowest reliability for prediction for transmission.

Figure 23:
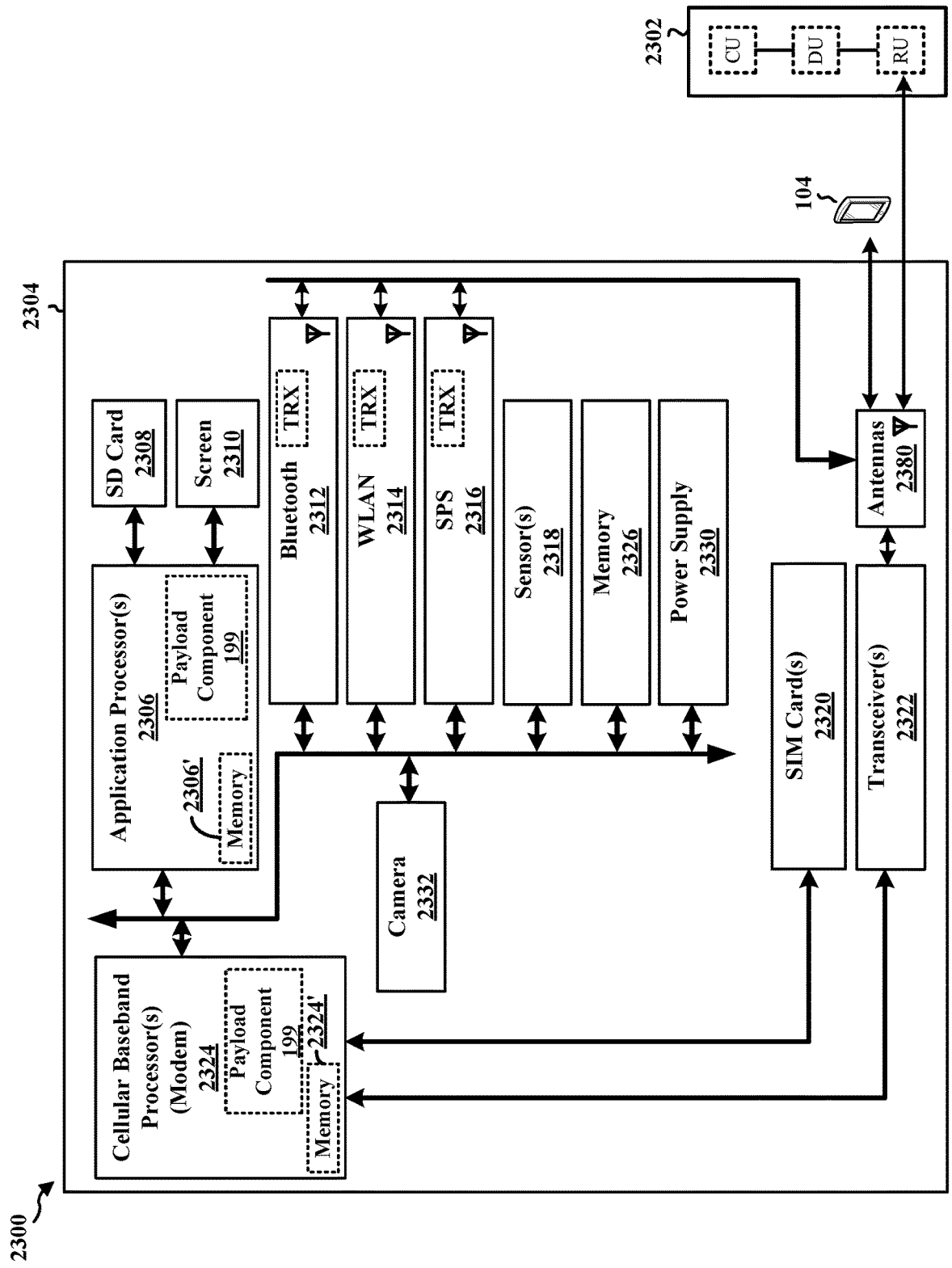
FIG. 23 is a diagram illustrating an example of a hardware implementation for an example apparatus and/or network entity.

At 2210, the second wireless device may perform a complementary prediction enhancement procedure. For example, 2210 may be performed by payload component 199 of apparatus 2304 or network entity 2302, 2402. The complementary prediction enhancement procedure may comprise at least one of a de-interleave operation or a code block de-order operation on decoded systematic bits of the video frame to predict content of one or more subsequent video frames based on a previously received video frame FIG. 23 is a diagram 2300 illustrating an example of a hardware implementation for an apparatus 2304. The apparatus 2304 may be a UE, a component of a UE, or may implement UE functionality. In some aspects, the apparatus 2304 may include at least one cellular baseband processor 2324 (also referred to as a modem) coupled to one or more transceivers 2322 (e.g., cellular RF transceiver). The cellular baseband processor(s) 2324 may include at least one on-chip memory 2324'. In some aspects, the apparatus 2304 may further include one or more subscriber identity modules (SIM) cards 2320 and at least one application processor 2306 coupled to a secure digital (SD) card 2308 and a screen 2310. The application processor(s) 2306 may include on-chip memory 2306'. In some aspects, the apparatus 2304 may further include a Bluetooth module 2312, a WLAN module 2314, an SPS module 2316 (e.g., GNSS module), one or more sensor modules 2318 (e.g., barometric pressure sensor/altimeter; motion sensor such as inertial measurement unit (IMU), gyroscope, and/or accelerometer(s); light detection and ranging (LIDAR), radio assisted detection and ranging (RADAR), sound navigation and ranging (SONAR), magnetometer, audio and/or other technologies used for positioning), additional memory modules 2326, a power supply 2330, and/or a camera 2332. The Bluetooth module 2312, the WLAN module 2314, and the SPS module 2316 may include an on-chip transceiver (TRX) (or in some cases, just a receiver (RX)). The Bluetooth module 2312, the WLAN module 2314, and the SPS module 2316 may include their own dedicated antennas and/or utilize the antennas 2380 for communication. The cellular baseband processor(s) 2324 communicates through the transceiver(s) 2322 via one or more antennas 2380 with the UE 104 and/or with an RU associated with a network entity 2302. The cellular baseband processor(s) 2324 and the application processor(s) 2306 may each include a computer-readable medium/memory 2324', 2306', respectively. The additional memory modules 2326 may also be considered a computer-readable medium/memory. Each computer-readable medium/memory 2324', 2306', 2326 may be non-transitory. The cellular baseband processor(s) 2324 and the application processor(s) 2306 are each responsible for general processing, including the execution of software stored on the computer-readable medium/memory. The software, when executed by the cellular baseband processor(s) 2324/application processor(s) 2306, causes the cellular baseband processor(s) 2324/application processor(s) 2306 to perform the various functions described supra. The cellular baseband processor(s) 2324 and the application processor(s) 2306 are configured to perform the various functions described supra based at least in part of the information stored in the memory. That is, the cellular baseband processor(s) 2324 and the application processor(s) 2306 may be configured to perform a first subset of the various functions described supra without information stored in the memory and may be configured to perform a second subset of the various functions described supra based on the information stored in the memory. The computer-readable medium/memory may also be used for storing data that is manipulated by the cellular baseband processor(s) 2324/application processor(s) 2306 when executing software. The cellular baseband processor(s) 2324/application processor(s) 2306 may be a component of the UE 350 and may include the at least one memory 360 and/or at least one of the TX processor 368, the RX processor 356, and the controller/processor 359. In one configuration, the apparatus 2304 may be at least one processor chip (modem and/or application) and include just the cellular baseband processor(s) 2324 and/or the application processor(s) 2306, and in another configuration, the apparatus 2304 may be the entire UE (e.g., see UE 350 of FIG. 3) and include the additional modules of the apparatus 2304.

Figure 24:
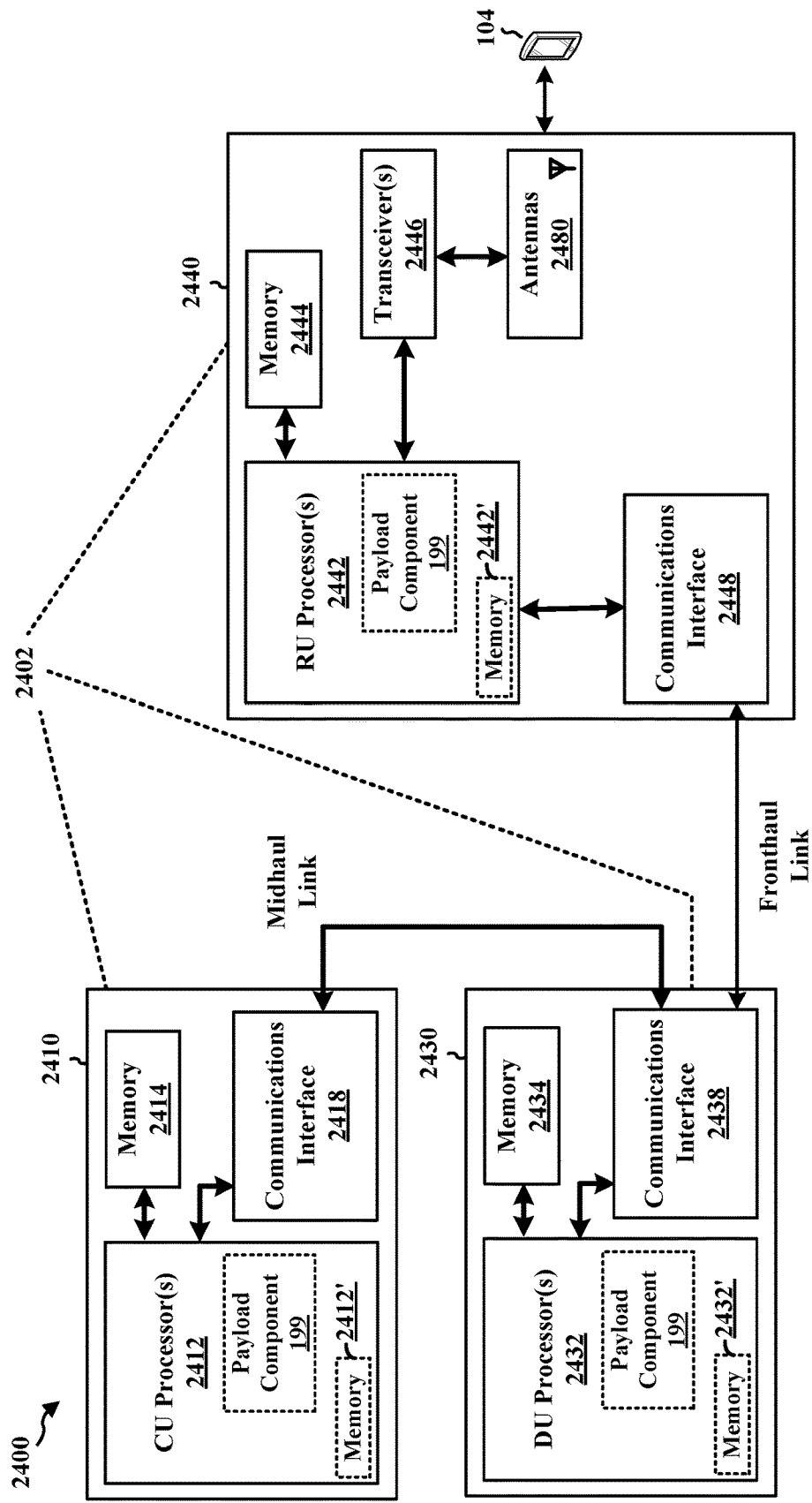
FIG. 24 is a diagram illustrating an example of a hardware implementation for an example network entity.

FIG. 24 is a diagram 2400 illustrating an example of a hardware implementation for a network entity 2402. The network entity 2402 may be a BS, a component of a BS, or may implement BS functionality. The network entity 2402 may include at least one of a CU 2410, a DU 2430, or an RU 2440. For example, depending on the layer functionality handled by the component 199, the network entity 2402 may include the CU 2410; both the CU 2410 and the DU 2430; each of the CU 2410, the DU 2430, and the RU 2440; the DU 2430; both the DU 2430 and the RU 2440; or the RU 2440. The CU 2410 may include at least one CU processor 2412. The CU processor(s) 2412 may include on-chip memory 2412'. In some aspects, the CU 2410 may further include additional memory modules 2414 and a communications interface 2418. The CU 2410 communicates with the DU 2430 through a midhaul link, such as an F1 interface. The DU 2430 may include at least one DU processor 2432. The DU processor(s) 2432 may include on-chip memory 2432'. In some aspects, the DU 2430 may further include additional memory modules 2434 and a communications interface 2438. The DU 2430 communicates with the RU 2440 through a fronthaul link. The RU 2440 may include at least one RU processor 2442. The RU processor(s) 2442 may include on-chip memory 2442'. In some aspects, the RU 2440 may further include additional memory modules 2444, one or more transceivers 2446, antennas 2480, and a communications interface 2448. The RU 2440 communicates with the UE 104. The on-chip memory 2412', 2432', 2442' and the additional memory modules 2414, 2434, 2444 may each be considered a computer-readable medium/memory. Each computer-readable medium/memory may be non-transitory. Each of the processors 2412, 2432, 2442 is responsible for general processing, including the execution of software stored on the computer-readable medium/memory. The software, when executed by the corresponding processor(s) causes the processor(s) to perform the various functions described supra. The computer-readable medium/memory may also be used for storing data that is manipulated by the processor(s) when executing software.

As discussed supra, the component 199 may be configured to receive, from a first wireless device, encoded systematic bits of a video frame comprising an imbalance enhancement of a prediction quality based on a prediction enhancement, wherein the prediction enhancement is based at least on an interleave operation or a code block order operation; and perform a complementary prediction enhancement procedure comprising at least one of a de-interleave operation or a code block de-order operation on decoded systematic bits of the video frame to predict content of one or more subsequent video frames based on a previously received video frame. In some aspects, the component 199 may be within the cellular baseband processor(s) 2324, the application processor(s) 2306, or both the cellular baseband processor(s) 2324 and the application processor(s) 2306. In some aspects, the component 199 may be within one or more processors of one or more of the CU 2410, DU 2430, and the RU 2440. The component 199 may be one or more hardware components specifically configured to carry out the stated processes/algorithm, implemented by one or more processors configured to perform the stated processes/algorithm, stored within a computer-readable medium for implementation by one or more processors, or some combination thereof. When multiple processors are implemented, the multiple processors may perform the stated processes/algorithm individually or in combination. As shown, the apparatus 2304 may include a variety of components configured for various functions. In one configuration, the apparatus 2304, and in particular the cellular baseband processor(s) 2324 and/or the application processor(s) 2306, may include means for receiving, from a first wireless device, encoded systematic bits of a video frame comprising an imbalance enhancement of a prediction quality based on a prediction enhancement. The prediction enhancement is based at least on an interleave operation or a code block order operation. The apparatus includes means for performing a complementary prediction enhancement procedure comprising at least one of a de-interleave operation or a code block de-order operation on decoded systematic bits of the video frame to predict content of one or more subsequent video frames based on a previously received video frame. The apparatus further includes means for receiving, from the first wireless device, an interleave indication indicating the interleave parameter from the set of interleave parameters utilized in the interleave operation. The interleave parameter is utilized in the de-interleave operation. The apparatus further includes means for receiving, from the first wireless device, an offset indication indicating at least one of the amount of the systematic bits that were transmitted or an amount of the systematic bits having a highest reliability that were punctured or skipped. The apparatus further includes means for receiving, from the first wireless device, a code block order indication indicating the code parameter from a set of code parameters utilized in the code block order operation. The code parameter is utilized in the code block de-order operation. The means may be the component 199 of the apparatus 2304 configured to perform the functions recited by the means. As described supra, the apparatus 2304 may include the TX processor 368, the RX processor 356, and the controller/processor 359. As such, in one configuration, the means may be the TX processor 368, the RX processor 356, and/or the controller/processor 359 configured to perform the functions recited by the means.

The network entity 2402 may include a variety of components configured for various functions. In one configuration, the network entity 2402 may include means for receiving, from a first wireless device, encoded systematic bits of a video frame comprising an imbalance enhancement of a prediction quality based on a prediction enhancement. The prediction enhancement is based at least on an interleave operation or a code block order operation. The network entity includes means for performing a complementary prediction enhancement procedure comprising at least one of a de-interleave operation or a code block de-order operation on decoded systematic bits of the video frame to predict content of one or more subsequent video frames based on a previously received video frame. The network entity further includes means for receiving, from the first wireless device, an interleave indication indicating the interleave parameter from the set of interleave parameters utilized in the interleave operation. The interleave parameter is utilized in the de-interleave operation. The network entity further includes means for receiving, from the first wireless device, an offset indication indicating at least one of the amount of the systematic bits that were transmitted or an amount of the systematic bits having a highest reliability that were punctured or skipped. The network entity further includes means for receiving, from the first wireless device, a code block order indication indicating the code parameter from a set of code parameters utilized in the code block order operation. The code parameter is utilized in the code block de-order operation. The means may be the component 199 of the network entity 2402 configured to perform the functions recited by the means. As described supra, the network entity 2402 may include the TX processor 316, the RX processor 370, and the controller/processor 375. As such, in one configuration, the means may be the TX processor 316, the RX processor 370, and/or the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not limited to the aspects described herein, but are to be accorded the full scope consistent with the language claims. Reference to an element in the singular does not mean "one and only one" unless specifically so stated, but rather "one or more." Terms such as "if," "when," and "while" do not imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. Sets should be interpreted as a set of elements where the elements number one or more. Accordingly, for a set of X, X would include one or more elements. When at least one processor is configured to perform a set of functions, the at least one processor, individually or in any combination, is configured to perform the set of functions. Accordingly, each processor of the at least one processor may be configured to perform a particular subset of the set of functions, where the subset is the full set, a proper subset of the set, or an empty subset of the set. If a first apparatus receives data from or transmits data to a second apparatus, the data may be received/transmitted directly between the first and second apparatuses, or indirectly between the first and second apparatuses through a set of apparatuses. A device configured to "output" data, such as a transmission, signal, or message, may transmit the data, for example with a transceiver, or may send the data to a device that transmits the data. A device configured to "obtain" data, such as a transmission, signal, or message, may receive, for example with a transceiver, or may obtain the data from a device that receives the data. Information stored in a memory includes instructions and/or data. All structural and functional equivalents to the elements of the various aspects described throughout this disclosure that are known or later come to be known to those of ordinary skill in the art are expressly incorporated herein by reference and are encompassed by the claims. Moreover, nothing disclosed herein is dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

The following aspects are illustrative only and may be combined with other aspects or teachings described herein, without limitation.

Aspect 1 is a method of wireless communication at a first wireless device comprising sorting one or more bits of a payload based on a corresponding priority; dividing the payload into one or more groups based on the corresponding priority, wherein each of the one or more groups is encoded separately; and transmitting, to a second wireless device, a video frame over a span of one or more slots based at least on a prioritized transmission of the one or more groups.

Aspect 2 is the method of aspect 1, further includes that the one or more bits of the payload are sorted based on at least one of a bit position; a DCT coefficient index; a color component; one or more segments of interest in a frame; or one or more segments of motion in the frame.

Aspect 3 is the method of any of aspects 1 and 2, further includes that division of the payload into the one or more groups is based on a most significant group to a least significant group, wherein each of the one or more groups comprise a corresponding MCS per transmission occasion.

Aspect 4 is the method of any of aspects 1-3, further includes that transmission of the video frame is based on the prioritized transmission or a prioritized retransmission of the one or more groups having a higher priority over the one or more groups having a lower priority.

Aspect 5 is the method of any of aspects 1-4, further includes that transmission or retransmission of the one or more groups having a lower priority occurs after transmission or retransmission of the one or more groups having a higher priority if resources are available.

Aspect 6 is the method of any of aspects 1-5, further including receiving, from a network entity, a sorting configuration comprising one or more parameters, wherein the one or more parameters comprise at least one of payload sorting parameters; a number of priority groups; a number of slots per video frame; or a modulation and coding scheme per group or per retransmission.

Aspect 7 is the method of any of aspects 1-6, further includes that the sorting configuration is received via at least one of RRC signaling, MAC-CE, or DCI, wherein the sorting configuration is received periodically or aperiodically.

Aspect 8 is an apparatus for wireless communication at a first wireless device including at least one processor coupled to a memory and at least one transceiver, the at least one processor configured to implement any of Aspects 1-7.

Aspect 9 is an apparatus for wireless communication at a first wireless device including means for implementing any of Aspects 1-7.

Aspect 10 is a computer-readable medium storing computer executable code, where the code when executed by a processor causes the processor to implement any of Aspects 1-7.

Aspect 11 is a method of wireless communication at a second wireless device comprising receiving, from a first wireless device, a video frame over a span of one or more slots based at least on a prioritized transmission of one or more groups of a divided payload; and transmitting, to the first wireless device, an ACK or NACK of reception of the video frame, wherein transmission of the video frame is based on the prioritized transmission or a prioritized retransmission of the one or more groups having a higher priority over the one or more groups having a lower priority.

Aspect 12 is the method of aspect 11, further includes that one or more bits of the divided payload are sorted based on at least one of a bit position; a DCT coefficient index; a color component; one or more segments of interest in a frame; or one or more segments of motion in the frame.

Aspect 13 is the method of any of aspects 11 and 12, further includes that division of the divided payload into the one or more groups is based on a most significant group to a least significant group, wherein each of the one or more groups comprise a corresponding MCS per transmission occasion.

Aspect 14 is the method of any of aspects 11-13, further includes that transmission or retransmission of the one or more groups having a lower priority occurs after transmission or retransmission of the one or more groups having a higher priority if resources are available.

Aspect 15 is an apparatus for wireless communication at a second wireless device including at least one processor coupled to a memory and at least one transceiver, the at least one processor configured to implement any of Aspects 11-14.

Aspect 16 is an apparatus for wireless communication at a second wireless device including means for implementing any of Aspects 11-14.

Aspect 17 is a computer-readable medium storing computer executable code, where the code when executed by a processor causes the processor to implement any of Aspects 11-14.

Aspect 18 is a method of wireless communication at a first wireless device comprising performing a prediction enhancement of a video compression output, wherein the prediction enhancement is based at least on an interleave operation or a code block order operation; and transmitting, to a second wireless device, encoded systematic bits of a video frame comprising an imbalance enhancement of a prediction quality based on the prediction enhancement.

Aspect 19 is the method of aspect 18, further includes that the interleave operation of the prediction enhancement distributes systematic bits over one or more code blocks, wherein each of the one or more code blocks comprise a similar distribution of prediction qualities, wherein the interleave operation comprises one or more video streams from one or more components, wherein the interleave operation is applied to at least a portion of a video frame of the video compression output.

Aspect 20 is the method of any of aspects 18 and 19, further includes that the interleave operation is based on an interleave parameter from a set of interleave parameters.

Aspect 21 is the method of any of aspects 18-20, further including transmitting, to the second wireless device, an interleave indication indicating the interleave parameter from the set of interleave parameters utilized in the interleave operation, wherein the interleave parameter is based on at least one of interleaved video frame regions, an interleave order, or an interleave pattern.

Aspect 22 is the method of any of aspects 18-21, further includes that the code block order operation of the prediction enhancement orders systematic bits based on a reliability of prediction quality, wherein the systematic bits are ordered based on the systematic bits having a highest reliability for prediction to the systematic bits having a lowest reliability for prediction, wherein the code block order operation comprises a rate matching offset to determine an amount of the systematic bits having the lowest reliability for prediction for transmission.

Aspect 23 is the method of any of aspects 18-22, further including transmitting, to the second wireless device, an offset indication indicating at least one of an amount of systematic bits transmitted or an amount of the systematic bits having a highest reliability that were punctured or skipped.

Aspect 24 is the method of any of aspects 18-23, further including transmitting, to the second wireless device, a code block order indication indicating a code parameter from a set of code parameters utilized in the code block order operation, wherein the code block order operation is based on the code parameter to equalize protection of the systematic bits based on a prediction quality distribution, wherein the code parameter is based on at least one of an order of the systematic bits based on a reliability of prediction quality, a codebook of different ordering, or an ordering for at least a part of a frame region of the video frame, wherein the code parameter is based on a reliability of the systematic bits, a sorted reliability of the systematic bits from a highest reliability to a lowest reliability, or an ordering of the systematic bits.

Aspect 25 is an apparatus for wireless communication at a first wireless device including at least one processor coupled to a memory and at least one transceiver, the at least one processor configured to implement any of Aspects 18-24.

Aspect 26 is an apparatus for wireless communication at a first wireless device including means for implementing any of Aspects 18-24.

Aspect 27 is a computer-readable medium storing computer executable code, where the code when executed by a processor causes the processor to implement any of Aspects 18-24.

Aspect 28 is a method of wireless communication at a second wireless device comprising receiving, from a first wireless device, encoded systematic bits of a video frame comprising an imbalance enhancement of a prediction quality based on a prediction enhancement, wherein the prediction enhancement is based at least on an interleave operation or a code block order operation; and performing a complementary prediction enhancement procedure comprising at least one of a de-interleave operation or a code block de-order operation on decoded systematic bits of the video frame to predict content of one or more subsequent video frames based on a previously received video frame.

Aspect 29 is the method of aspect 28, further includes that the interleave operation of the prediction enhancement distributes systematic bits over one or more code blocks, wherein each of the one or more code blocks comprise a similar distribution of prediction qualities, wherein the interleave operation comprises one or more video streams from one or more components.

Aspect 30 is the method of any of aspects 28 and 29, further includes that the interleave operation is based on an interleave parameter from a set of interleave parameters.

Aspect 31 is the method of any of aspects 28-30, further including receiving, from the first wireless device, an interleave indication indicating the interleave parameter from the set of interleave parameters utilized in the interleave operation, wherein the interleave parameter is utilized in the de-interleave operation, wherein the interleave parameter is based on at least one of interleaved video frame regions, an interleave order, or an interleave pattern.

Aspect 32 is the method of any of aspects 28-31, further includes that the code block order operation of the prediction enhancement orders systematic bits based on a reliability of prediction quality, wherein the systematic bits are ordered based on the systematic bits having a highest reliability for prediction to the systematic bits having a lowest reliability for prediction, wherein the code block order operation comprises a rate matching offset to determine an amount of the systematic bits having the lowest reliability for prediction for transmission.

Aspect 33 is the method of any of aspects 28-32, further including receiving, from the first wireless device, an offset indication indicating at least one of an amount of systematic bits transmitted or an amount of the systematic bits having a highest reliability that were punctured or skipped.

Aspect 34 is the method of any of aspects 28-33, further including receiving, from the first wireless device, a code block order indication indicating a code parameter from a set of code parameters utilized in the code block order operation, wherein the code block order operation is based on the code parameter to equalize protection of the systematic bits based on a prediction quality distribution, wherein the code parameter is utilized in the code block de-order operation, wherein the code parameter is based on at least one of an order of the systematic bits based on a reliability of prediction quality, a codebook of different ordering, or an ordering for at least a part of a frame region of the video frame, wherein the code parameter is based on a reliability of the systematic bits, a sorted reliability of the systematic bits from a highest reliability to a lowest reliability, or an ordering of the systematic bits.

Aspect 35 is an apparatus for wireless communication at a second wireless device including at least one processor coupled to a memory and at least one transceiver, the at least one processor configured to implement any of Aspects 28-34.

Aspect 36 is an apparatus for wireless communication at a second wireless device including means for implementing any of Aspects 28-34.

Aspect 37 is a computer-readable medium storing computer executable code, where the code when executed by a processor causes the processor to implement any of Aspects 28-34.

What is claimed is:

1. An apparatus for wireless communication at a first wireless device, comprising:
    at least one memory; and
    at least one processor coupled to the at least one memory and, based at least in part on information stored in the at least one memory, the at least one processor, individually or in any combination, is configured to cause the apparatus to:
        sort one or more bits of a payload based on a corresponding priority;
        divide the sorted payload into one or more groups based on the corresponding priority, wherein each of the one or more groups is encoded separately; and
        transmit, to a second wireless device, a video frame over a span of one or more slots, wherein a number of slots of the one or more slots are allocated per video frame for a prioritized transmission of the divided one or more groups, and wherein the number of slots allocated per video frame is associated with the corresponding priority that is associated with the divided payload.

2. The apparatus of claim 1, further comprising a transceiver coupled to the at least one processor, the transceiver being configured to:
    transmit, to the second wireless device, the video frame over the span of the one or more slots.

3. The apparatus of claim 1, wherein the one or more bits of the payload are sorted based on at least one of:
    a bit position;
    a discrete cosine transform (DCT) coefficient index;
    a color component;
    one or more segments of interest in a frame; or
    one or more segments of motion in the frame.

4. The apparatus of claim 1, wherein to divide the sorted payload into one or more groups based on the corresponding priority, the at least one processor is configured to divide the sorted payload into the one or more groups based on a most significant group to a least significant group, wherein each of the one or more groups comprise a corresponding modulation and coding scheme (MCS) per transmission occasion.

5. The apparatus of claim 1, where to transmit the video frame, the at least one processor is configured to transmit the video frame based on the prioritized transmission or a prioritized retransmission of the one or more groups having a higher priority over the one or more groups having a lower priority.

6. The apparatus of claim 1, wherein a transmission or retransmission of the one or more groups having a lower priority occurs after transmission or retransmission of the one or more groups having a higher priority if resources are available.

7. The apparatus of claim 1, wherein the at least one processor is configured to:
    receive, from a network entity, a sorting configuration comprising one or more parameters, wherein the one or more parameters comprise at least one of:
        payload sorting parameters;
        a number of priority groups;
        a number of slots per video frame; or
        a modulation and coding scheme per group or per retransmission.

8. The apparatus of claim 7, wherein to receive the sorting configuration the at least one processor is configured to receive the sorting configuration via at least one of radio resource control (RRC) signaling, media access control (MAC) control element (CE) (MAC-CE), or downlink control information (DCI) periodically or aperiodically.

9. An apparatus for wireless communication at a second wireless device, comprising:
    at least one memory; and
    at least one processor coupled to the at least one memory and, based at least in part on information stored in the at least one memory, the at least one processor, individually or in any combination, is configured to cause the apparatus to:
        receive, from a first wireless device, a video frame over a span of one or more slots, wherein a number of slots of the one or more slots are allocated per video frame for a prioritized transmission of one or more groups of a divided payload, and wherein the number of slots allocated per video frame is associated with a priority that is associated with the divided payload; and
        transmit, to the first wireless device, an acknowledgement (ACK) or non-acknowledgment (NACK) of reception of the video frame.

10. The apparatus of claim 9, further comprising a transceiver coupled to the at least one processor, the transceiver being configured to:
    receive, from the first wireless device, the video frame over the span of the one or more slots; and
    transmit, to the second wireless device, the ACK or the NACK of reception of the video frame.

11. The apparatus of claim 9, wherein one or more bits of the divided payload are sorted based on at least one of:
    a bit position;
    a discrete cosine transform (DCT) coefficient index;
    a color component;
    one or more segments of interest in a frame; or
    one or more segments of motion in the frame.

12. The apparatus of claim 9, wherein division of the divided payload into the one or more groups is based on a most significant group to a least significant group, wherein each of the one or more groups comprise a corresponding modulation and coding scheme (MCS) per transmission occasion.

13. The apparatus of claim 9, wherein a transmission or retransmission of the one or more groups having a lower priority occurs-after transmission or retransmission of the one or more groups having a higher priority if resources are available.

* * * * *